Feb. 26, 1963 C. W. E. WALKER 3,079,552
INSTRUMENT FOR THE MEASUREMENT OF MOISTURE AND THE LIKE
Filed Jan. 24, 1961 7 Sheets-Sheet 1
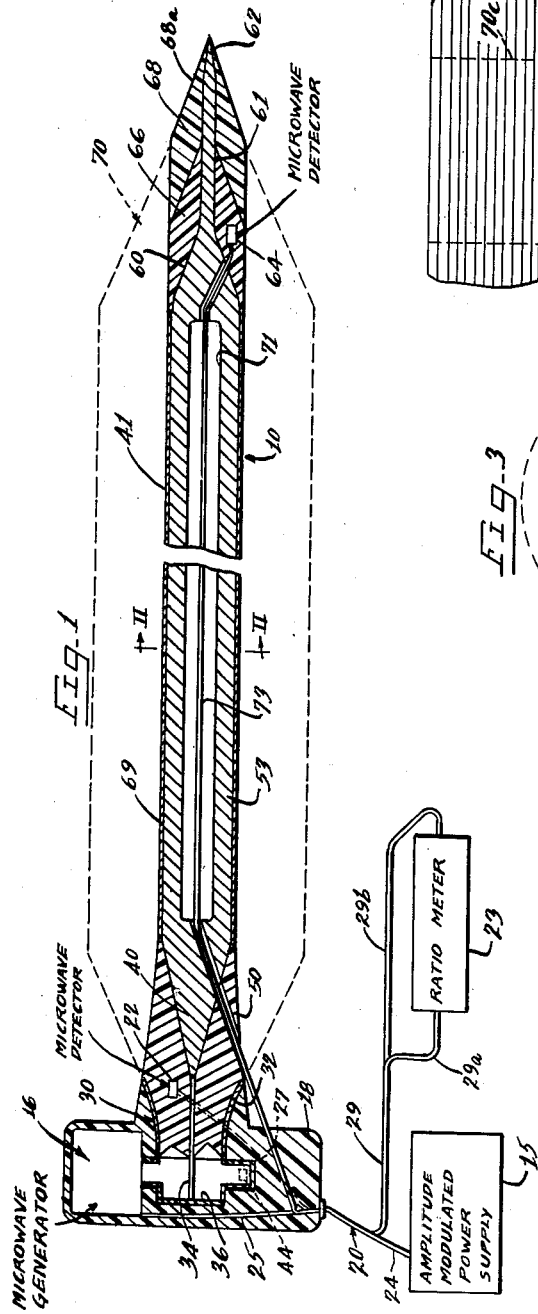
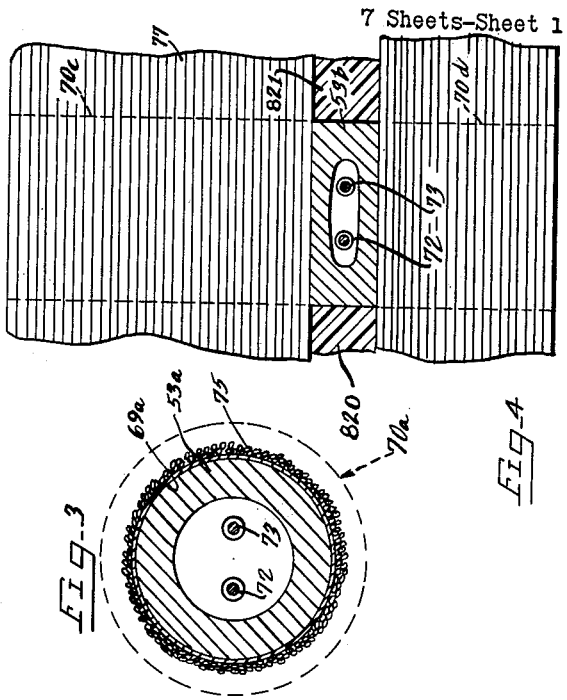
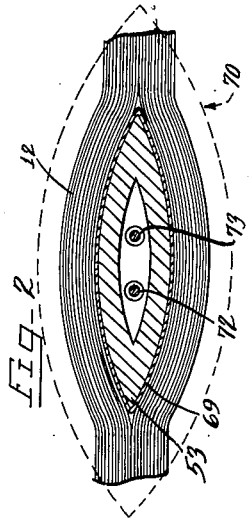
INVENTOR.
Charles W.E. Walker
BY
ATTORNEYS

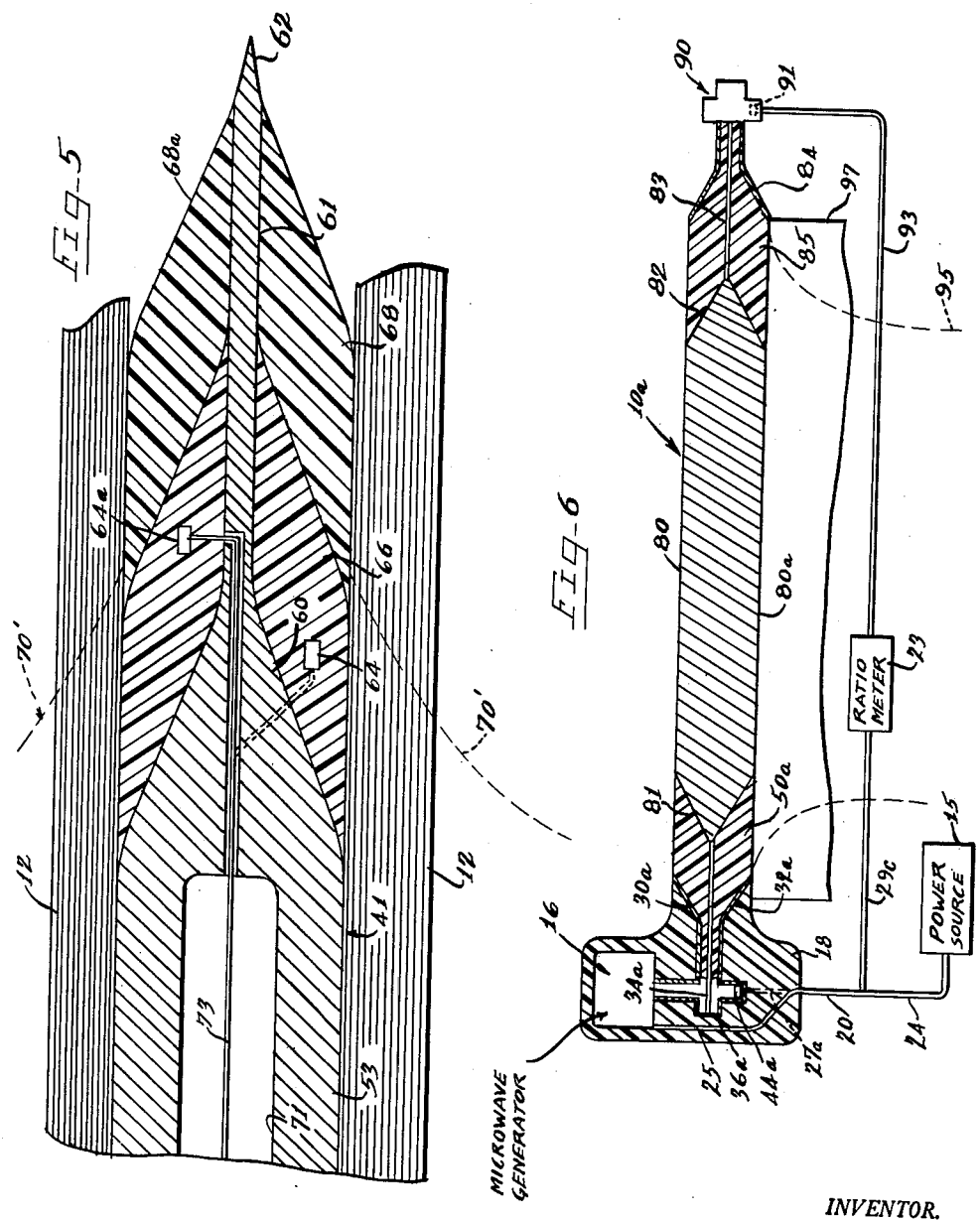

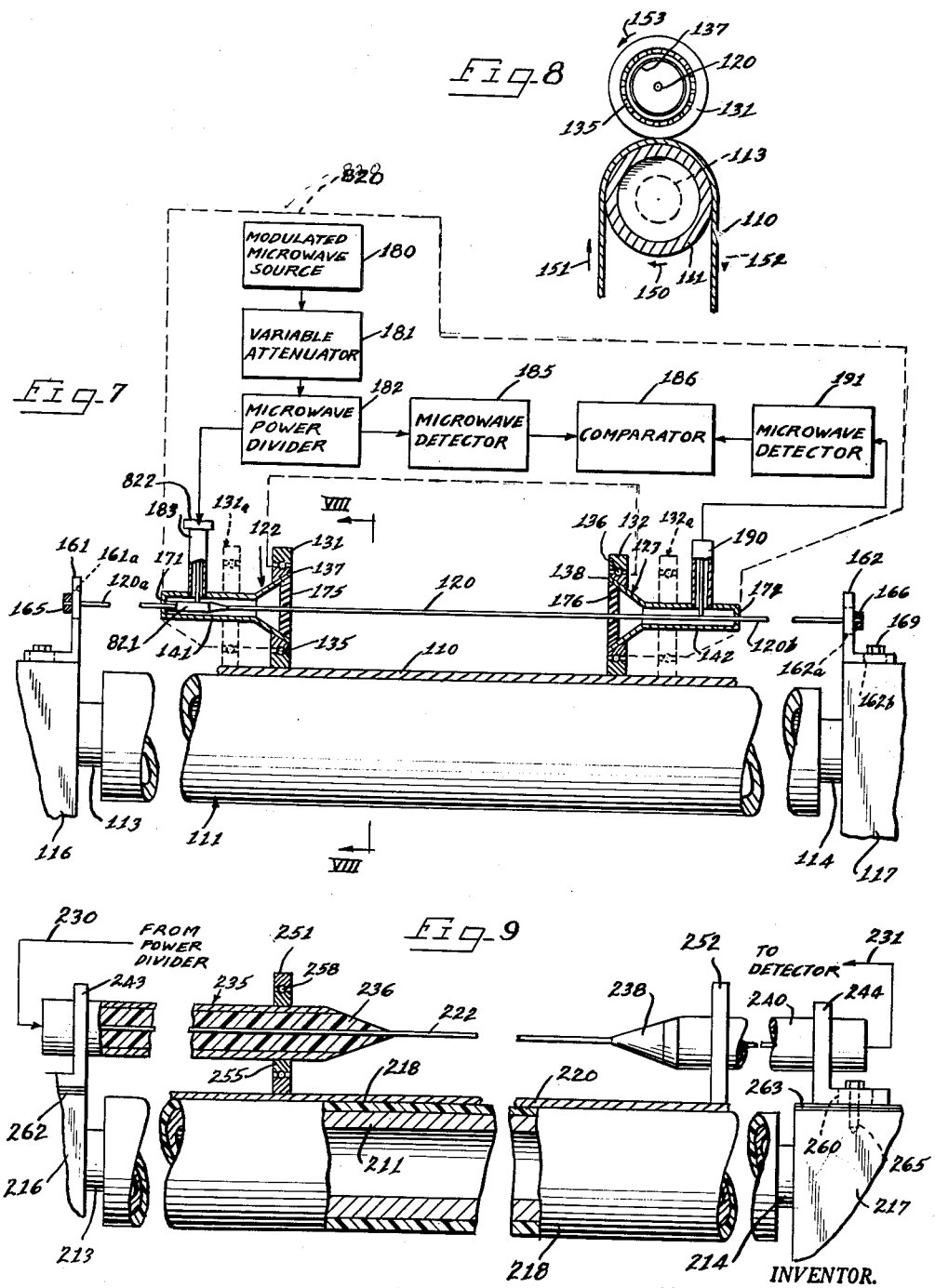

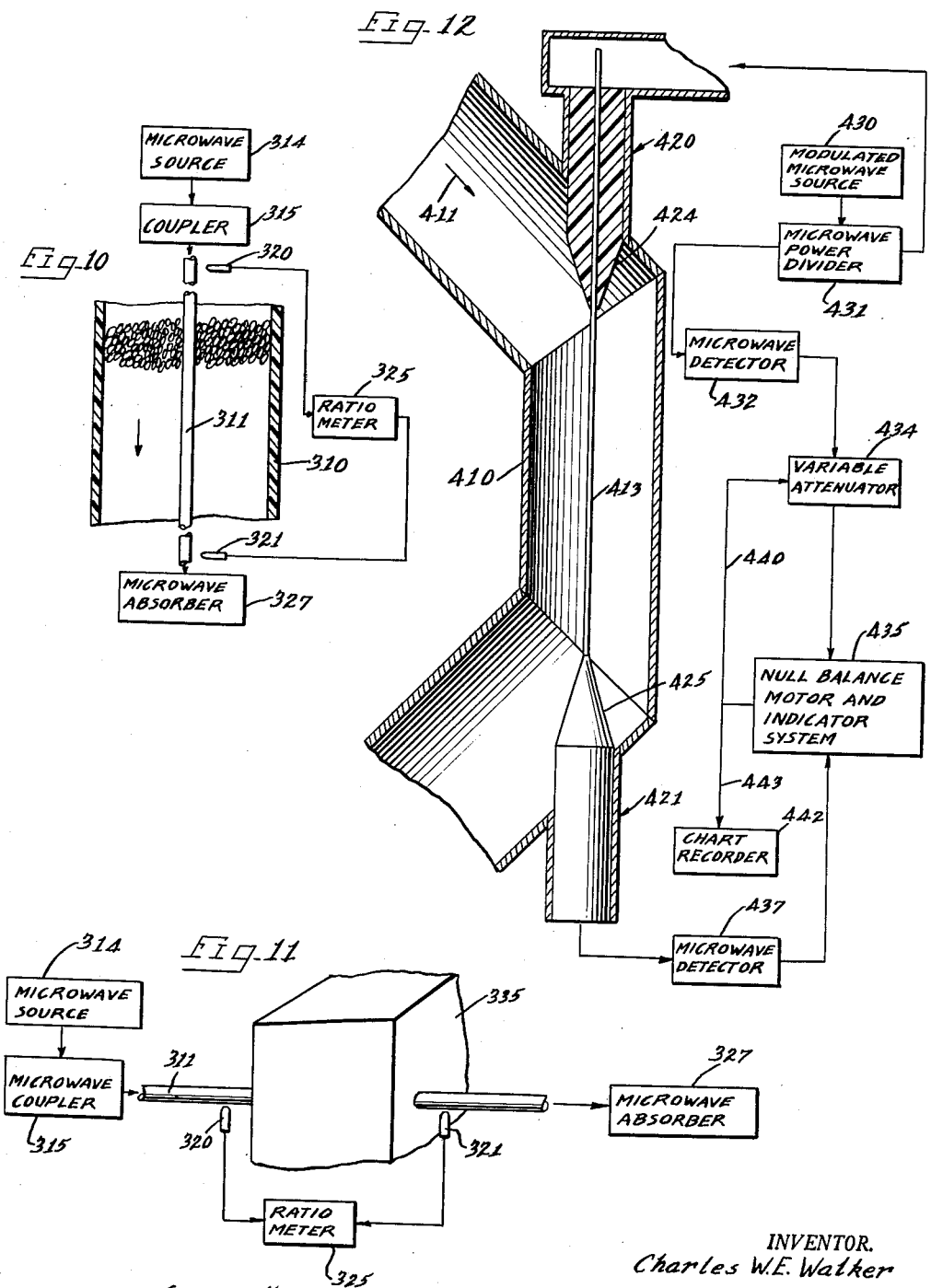

Feb. 26, 1963 C. W. E. WALKER 3,079,552
INSTRUMENT FOR THE MEASUREMENT OF MOISTURE AND THE LIKE
Filed Jan. 24, 1961 7 Sheets-Sheet 6
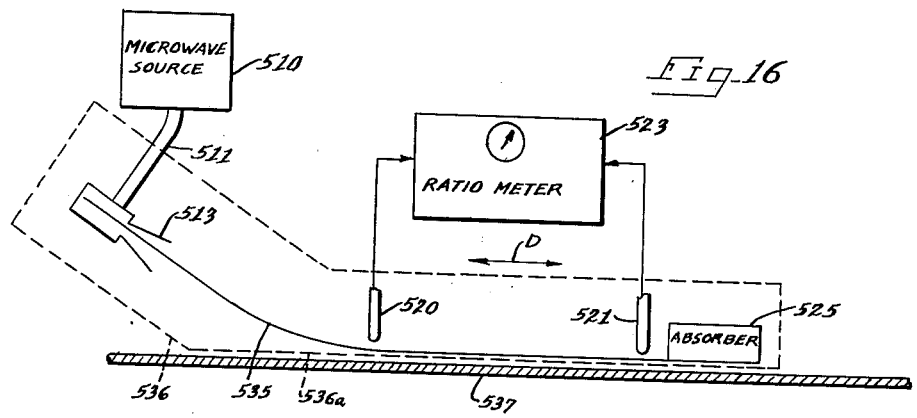
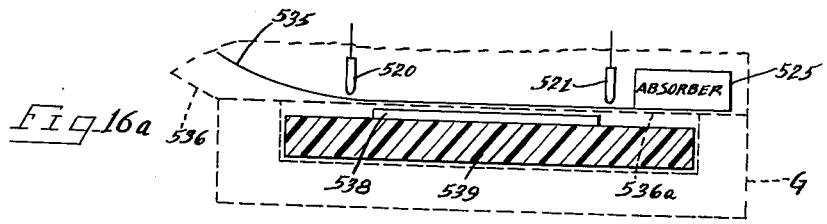
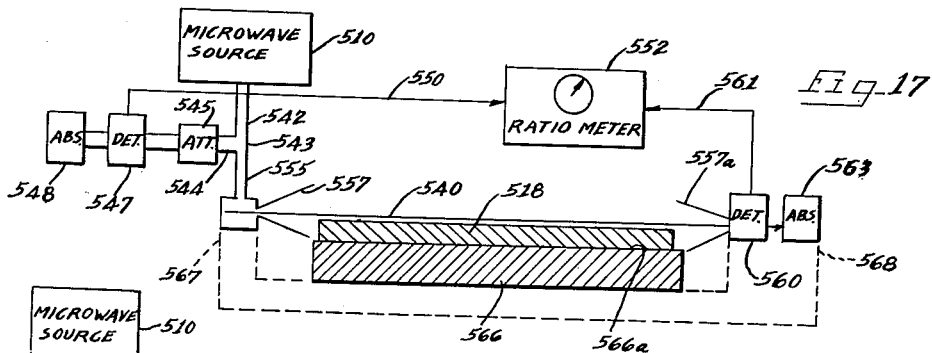
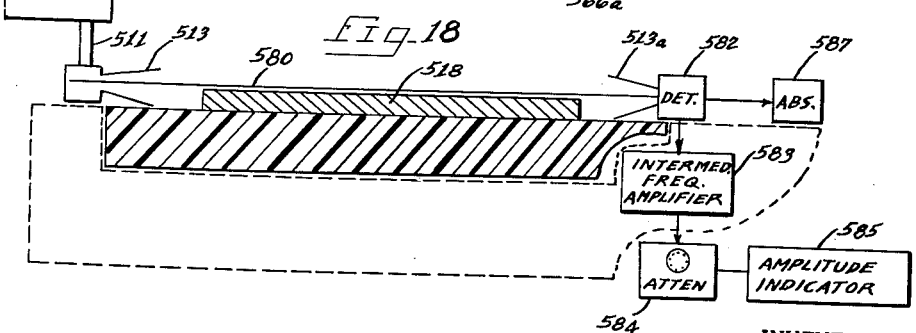
INVENTOR.
Charles W.E. Walker
BY
ATTORNEYS

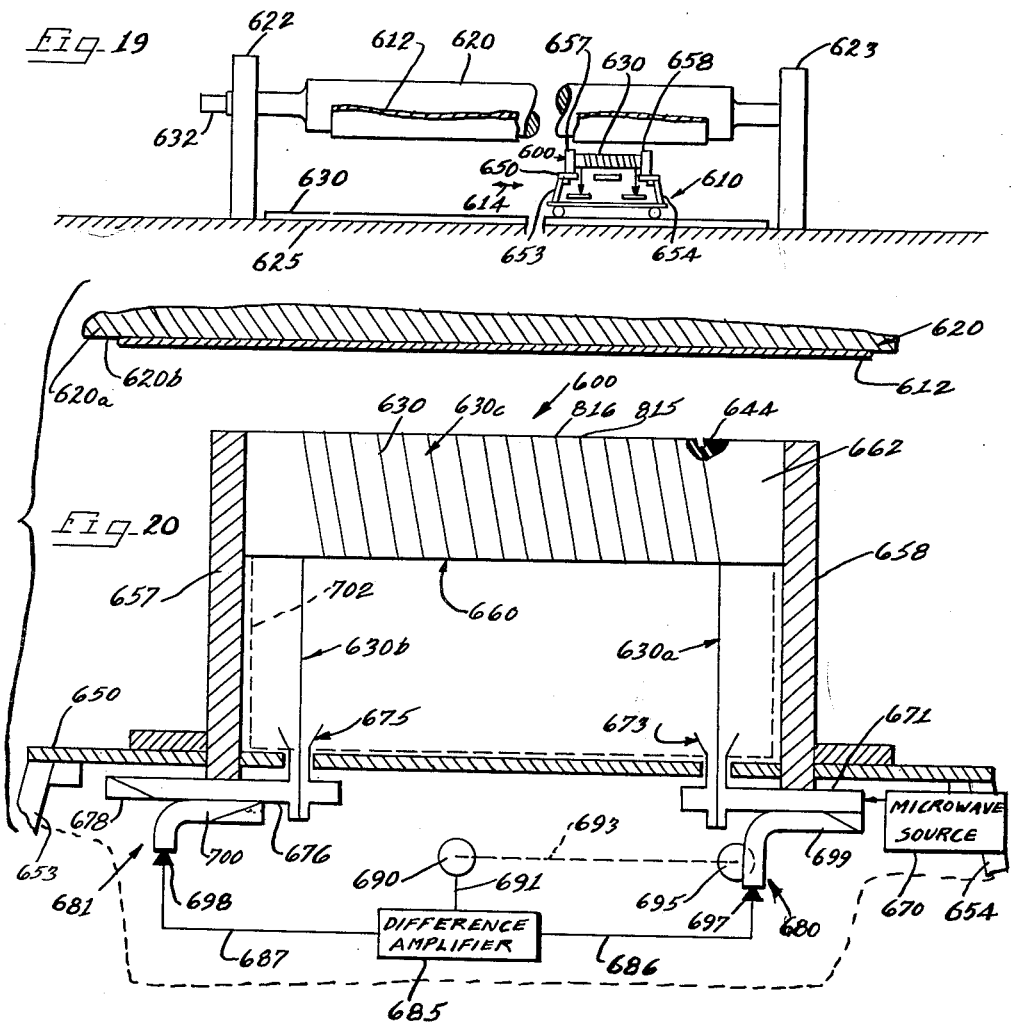

United States Patent Office 3,079,552
Patented Feb. 26, 1963

3,079,552
INSTRUMENT FOR THE MEASUREMENT OF MOISTURE AND THE LIKE
Charles W. E. Walker, Beloit, Wis., assignor to Beloit Iron Works, Beloit, Wis., a corporation of Wisconsin
Filed Jan. 24, 1961, Ser. No. 84,657
13 Claims. (Cl. 324—58.5)

This invention relates to a system and method for determining the presence of a substance intimately associated with a material.

A highly important use of the present invention is in the accurate and rapid measurement of moisture content of solid materials. By way of example, a system in accordance with the present invention will measure the moisture content of a travelling web of paper or of flowing granular material. The invention also lends itself to rapid sampling of the moisture content of material in bulk storage, such as stacks of paper sheet or board, or grain in railroad cars or storage bins. In each of these instances, accurate and convenient measurement of moisture content is of great commercial importance and a satisfactory method for obtaining such measurement has been an urgent and long felt need.

A major limitation in prior art systems for measuring the moisture content of granular material, for example, resides in the limited sample of the material which can be practically tested. Further the prior art arrangements require that a sample of such material be removed from its normal storage location for test. In the case of a web of material or the like, prior art systems require that the web be threaded through a slot between confronting parts of the system. In systems where the energy is radiated across a gap, the energy is completely unguided in the gap and the larger the gap (to facilitate threading) the greater the amount of energy which is lost from the system as spurious radiation. The smaller the slot, the greater the difficulty encountered in threading the web therethrough. In these radiation systems, the cross section of web which can be sampled is limited by the size of practical radiating and receiving horns.

The present invention is based on the concept of bringing the material having a constituent to be detected into stable coupling relationship to the surface wave associated with a surface wave transmission path, and detecting the surface wave as a measure of the presence of said constituent. This concept leads to a highly versatile and efficient test instrument. The extent of the sample which may be tested is not limited by the practical cross section of the system, but is dependent on the length dimension of the surface wave transmission path in coupling relationship with the material under test.

For materials stored in bulk, the surface wave transmission line may simply extend through the material or be manually inserted into the material at any desired number of points to obtain a moisture measurement. For example, a sword-like sensing device may be used for sampling moisture content of grain and the like stored in railroad cars or in stationary bins and for sampling moisture content of stacked material such as paper sheet or board. Heretofore such measurements have been made by actually removing a sample from the mass of material and transporting it to a laboratory or the like for test. By measurement of the material directly at its place of storage, the accuracy and reliability of measurement is improved, while the convenience and rapidity of measurement is radically enhanced.

For thin travelling webs of paper and the like the surface wave transmission line may extend across the entire transverse extent of the web. By this means, an extremely accurate measure is obtained at a precisely determined increment of the web, and the moisture content of the entire web may be reliably determined by actual measurement as the web travels past the measurement point along its normal path of movement and at its normal speed. A system in accordance with the present invention particularly adapted for measuring moisture content in moving webs is disclosed in my copending application Serial No. 644,394 filed March 6, 1957, of which the present application is a continuation in part.

Improvements over my application Serial No. 644,394 are disclosed in my copending application Serial No. 710,766 filed January 23, 1958, of which the present application is a continuation in part. Application Serial No. 710,766 discloses a system for measuring moisture content of flowing granular material wherein one or more single conductor surface wave transmission lines extend along the direction of flow of the material. Application Serial No. 710,766 also discloses the concept of inserting a single conductor surface wave transmission line through a stationary mass of solid material, and the new subject matter of the present application is particularly directed to embodiments of this concept.

Further improvements are disclosed in my copending application Serial No. 753,987 filed August 8, 1958. This application particularly deals with the concept of a surface wave transmission line in the form of a coil which is coupled to a material under test at successive turns thereof.

It is therefore an important object of the present invention to provide a novel method and means for determining the amount of a substance such as moisture associated with a solid or fluid material.

A further object of the present invention is to provide a system and method for sensing a constituent of material along a linearly extended sample of such material.

Still another object of the present invention is to provide a system and method for detecting a substance associated with a test material such as an elongated web wherein the system may be brought into operative relationship to the material without the necessity of threading between closely spaced confronting parts of the system.

Yet another object of the invention is to provide a system and method for sensing a substance associated with a material wherein the sensing device may be readily and conveniently inserted into the material stored in bulk for measurement and then removed from the material.

Another and further object of the present invention is to provide an extremely compact system for sensing a substance associated with a material.

Other objects, features and advantages of the present invention will be apparent from the following detailed description taken in connection with the accompanying drawings, in which:

FIGURE 1 is a diagrammatic longitudinal sectional view of a sensing device for determining the amount of substance associated with a material which is particularly adapted to be inserted into operative association with a material stored in bulk;

FIGURE 2 is a diagrammatic cross sectional view of the device of FIGURE 1 taken generally along the line II—II of FIGURE 1 and illustrating the manner in which the device may be associated with a stack of paper sheet or board;

FIGURE 3 illustrates a cross sectional view of a sensing device similar to that of FIGURE 1, but with a substantially circular cross section;

FIGURE 4 illustrates a further cross sectional view of an embodiment similar to that of FIGURE 1 but illustrating a sensing device with a substantially rectangular exterior perimeter and having a metal surface in contact with the material whose moisture content or the like is to be sensed;

FIGURE 5 is an enlarged fragmentary longitudinal sectional view of the insertion end of the device of FIGURE 1 but illustrating a sensing device wherein a metal surface is in contact with the material whose moisture content or the like is to be sensed as in the embodiment of FIGURE 4;

FIGURE 6 is a diagrammatic longitudinal sectional view of a sensing device somewhat similar to that of FIGURES 1 and 5 but which is adapted to be brought laterally into contact with a material under test, rather than being inserted into the material in a direction longitudinally of the device;

FIGURE 7 is a fragmentary somewhat diagrammatic vertical sectional view illustrating an embodiment of the invention for sensing moisture content or the like of a moving web of material;

FIGURE 8 is a fragmentary cross sectional view of the system of FIGURE 7 taken generally along the lines VIII—VIII of FIGURE 7;

FIGURE 9 is a fragmentary somewhat diagrammatic vertical sectional view illustrating a further embodiment for sensing moisture content of a paper web or the like;

FIGURE 10 is a fragmentary somewhat diagrammatic vertical sectional view illustrating a system for sensing moisture content or the like of a granular or liquid material flowing in a tube;

FIGURE 11 illustrates the insertion of a single conductor transmission line such as shown in FIGURE 10 through a solid material to obtain an indication of the moisture content or the like thereof;

FIGURE 12 illustrates an embodiment for sensing moisture content or the like similar to that of FIGURE 10;

FIGURE 13 is a diagrammatic illustration of a further system for sensing moisture content of a travelling web or the like;

FIGURE 16 is a diagrammatic illustration of a further embodiment particularly adapted for sensing moisture content of a travelling web;

FIGURE 16A is a fragmentary view similar to FIGURE 16 but illustrating the sensing of moisture content of articles transported by a conveyor;

FIGURE 17 is a diagrammatic illustration of a further embodiment for sensing moisture content or the like of a travelling web and specifically illustrating a metal supporting surface for the web;

FIGURE 18 illustrates a further embodiment of the present invention for sensing moisture content of a travelling web or the like wherein the web is supported by means of a solid dielectric material in coupling relation to the microwave energy of the system;

FIGURE 19 is a somewhat diagrammatic elevational view illustrating a sensing system wherein the sensing head may be moved transversely of the direction of web movement to scan successive transverse sections of the moving web;

Figure 13:
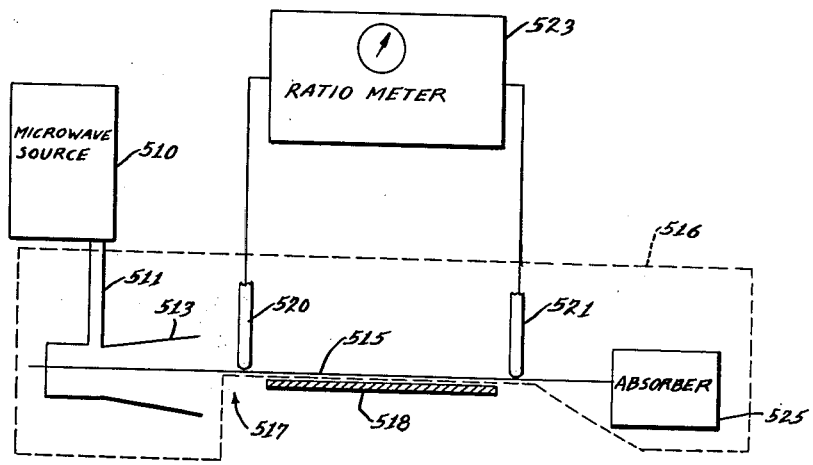

FIGURE 20 is a somewhat diagrammatic vertical sectional view illustrating the details of a suitable sensing head for the system of FIGURE 19; and FIGURE 21 is an elevational view similar to that of FIGURE 19 with respect to the web transporting mechanism but showing a view of the web transporting mechanism at right angles to that of FIGURE 19 and illustrating a modified arrangement for the sensing head of FIGURE 20 wherein the axis of the sensing head is generally parallel to the direction of movement of the web rather than at right angles thereto as in FIGURE 19.

As shown on the drawings:

FIGURE 1 illustrates a first embodiment of the present invention wherein a rigid self-sustaining device 10 is adapted to be inserted through a stationary mass of material having a substance associated therewith which is to be measured. By way of example, the sensing device 10 may be utilized to measure moisture content of grain in railroad cars or storage bins, liquids or gases in bulk storage, or stacked material such as paper sheet or board material. In FIGURE 2, the sensing device is illustrated in conjunction with a stack of paper sheet or board 12.

In FIGURE 1, an amplitude modulated power supply component 15 is shown delivering power to a suitable microwave generator 16 which may for example comprise an oscillator using a reflex velocity-modulated tube such as a "Klystron." The present state of the art permits the encapsulation of such a generator in a casing 18 of relatively small dimensions and of a size to be readily grasped by the hand in manipulation of the sensing device.

For example, the Varian VA96 is only 2 to 3 inches long and about ¾ to 1 inch in diameter. In the present state of the art, encapsulation would require a cooling system of forced air or liquid. Sufficient metallic area of the device could be left exposed to allow cooling by an external fan. In place of a "Klystron" oscillator, a microwave generator utilizing a solid state tunnel diode may be employed. Such a device is already known to produce frequencies as high as 10,000 megacycles per second and it is to be expected that the range will be extended to still higher frequencies such as 22,250 megacycles per second, if these higher operating frequencies have not already been achieved. In any event, such a microwave generator would be usable for substances such as $D_2O$ or $HDO$ which have microwave resonances below 10,000 megacycles per second. The output from the tunnel diode generator could well feed directly into a coaxial waveguide such as indicated at 34, 32 in FIGURE 1.

A multiplex flexible cable 20 conducts the input power from component 15 to microwave generator 16 and also conducts power from microwave detector unit 22 to a ratio meter component 23. Specifically, the input power is conveyed from component 15 via cable 24, multiplex cable 20, and cable 25 extending within the casing 18 to the microwave generator component 16, while detector 22 connects with an input to ratio meter 23 via cable 27, multiplex cable 20 and cables 29 and 29a.

The output of the microwave generator 16 is coupled to launching device 30 which comprises a flaring outer conductor portion 32, a central inner conductor member 34 and rectangular waveguide member 36 receiving member 34. It will be observed that the detector 22 is positioned generally at the mouth of the launching horn 30 for sensing the incipient surface wave travelling along the conductor 34. The member 34 is connected to the tapered inner end 40 of surface wave transmission line 41. Alternatively, a detector may be located as indicated at 44 in the rectangular waveguide associated with the output from microwave generator 16, and the detector 44 would then be suitably connected to multiplex cable 20 and cable 29 for delivering the detected signal to the input of comparator 23. The launching horn 30 and detector 22 are preferably imbedded in a dielectric material 50 which tends to restrict the microwave energy to a region close to the conductor portion 40 to minimize radiation loss from the launching horn 30. The dielectric material 50 also serves to maintain a rigid spacial relationship between detector 22 and the surface wave transmission line.

The main part of the single conductor surface wave transmission line comprises a hollow member 53 which may have a conductivity intermediate that of the relatively perfect conductors such as copper and that of the semi-conductors. In the embodiment of FIGURES 1 and 2 the main conductor portion 53 has a generally oval exterior perimeter as best seen in FIGURE 2.

It has been discovered that it is possible to utilize surface wave transmisison lines which are much more massive in cross section than has heretofore been contemplated. For example, the prior art considers surface wave transmission lines in which the conductor radius is between one-fiftieth and one five-hundredth of the wavelength, while in accordance with the present invention surface waves are effectively transmitted along conductors whose cross sectional dimensions are of the order of one wavelength or greater. This is accomplished, for example, by launching the surface wave along a conductor portion such as indicated at 34 which is of relatively small diameter. The conductor 34 is imbedded in a solid dielectric material such as indicated at 50 which provides mechanical support and rigidity. The transition from the small diameter wire 34 to the larger cross section conductor as indicated at 53 in FIGURES 1 and 2 is made gradually as indicated by the tapered section 40 in FIGURE 1 so as to minimize reflection.

Owing to the relatively large size of the conductor which is necessary for rigidity the surface wave energy will spread farther from the conductor surface than from the surface of a small diameter wire, but this spread will be restricted somewhat by the use of a conductor resistivity substantially less than that of the relatively perfect conductors such as copper. In the region of 20,000 megacycles per second the spread may be such that 75% of the wave energy will be within 4 to 6 wavelengths from the conductor surface. For measuring material in bulk such a spread is often desirable so that the average moisture in a fair volume of the material is sensed. If greater restriction of the wave energy is required for any particular application this can readily be achieved by the addition of a thin dielectric coating on the conductor surface such as indicated at 69 in FIGURE 1. Such a coating might usefully be a hard ceramic or metal oxide having a precisely controlled thickness which can be applied by evaporation techniques. With a dielectric coating it is readily possible to restrict the spread of the surface wave so that 95% of the energy is within one-half wavelength or less from the conductor surface even when the conductor is of high conductivity such as that of copper.

The outer end of the surface wave transmission line 41 is tapered as indicated at 60 to a relatively small diameter portion 61 which terminates in a sharp point at 62 at the end of the sensing device 10. The tapering portion 60 and microwave detector 64 are encapsulated in a solid dielectric 66 for tending to constrict the surface wave in conformity with the taper of the line portion 60 to minimize radiation from the device. The terminal portion of the device is imbedded in a high loss dielectric material 68 which may be, for example, a polyethylene plastic filled or loaded with a conductive material. The material 68 is chosen and shaped to suit the particular frequency selected which will depend upon the substance to be measured. The purpose of the material 68 is to minimize or eliminate reflections which might otherwise cause spurious readings at the detector 64. Instead of a lossy dielectric such as shown at 68 in FIGURE 1 to act as the terminating power absorber, the line portion 61 could be coated toward its end with graphite, the graphite being protected by plastic encapsulation or by a hard ceramic or metal oxide coating. The detector may alternatively be located as indicated at 64a in FIGURE 5 radially outwardly of the small diameter line portion 61.

The surface wave transmission line section 53 may be of sufficient diameter and thickness to be substantially rigid and self-sustaining. By way of example, the cross section as seen in FIGURE 2 may have a height dimension of about ¼ to ½ a wavelength and a horizontal dimension of about one wavelength where the surface wave is transmitted at a frequency of approximately 22,235 megacycles per second corresponding to a wavelength of approximately 1.35 centimeters, a resonance absorption frequency for water. The main transmission line portion 53 may be made of stainless steel, for example, and preferably has a resistivity of at least about $10 \times 10^{-6}$ ohm-centimeters but less than a resistivity of $1000 \times 10^{-6}$ ohm-centimeters (volume resistivity at 0° C.). With a resistivity of the order of steel, for example about $100 \times 10^{-6}$ ohm-centimeters, 75% of the energy of the surface wave transmitted along the line 41 will occupy a region to a distance of about 10 centimeters from the line. With a suitable dielectric coating on the external surface of the line section 53 as indicated at 69, the region containing 95% of the wave energy might extend only one centimeter from the exterior surface of section 53, as indicated in FIGURES 1 and 2 by the dash line 70.

The hollow interior space 71 of member 53 may accommodate a pair of insulated conductors 72 and 73 carrying direct or low frequency modulation current from the detector 64 to a second input of ratio meter 23 via multiplex cable 20, cable 29 and cable 29b. A suitable commercially available instrument for component 23 is the Hewlett-Packard ratio meter Model 416A. The meter may be provided with a suitable scale for indicating a numerical value related to the power absorbed by the test material—principally the test material within the region 70. For example, the component 23 may indicate the ratio between the output of detector 22 and the output of detector 64. The meter may be calibrated by projecting microwave energy along the wave guide 41 with known quantities of water within the volume sensed by the microwave energy. Zero adjustment could be made prior to each use by projecting microwave energy along the waveguide 41 with only air or with completely dry material within the region sensed. An attenuator within the ratio meter is used to adjust the relative strength of the signals from the two detectors 22 and 64 to equality under these conditions. This adjustment might also be made by adjusting the gain provided for the two signals in the ratio meter.

In use of the embodiment of FIGURES 1 and 2, the pointed end 62, 68a of the device 10 is inserted into or through a mass of material whose moisture content is to be determined, for example a stack of paper sheet or board as indicated at 12 in FIGURE 2. The microwave generator 16 is then energized from power supply 15 via multiplex cable 20 to transmit a surface wave along the external surface of the surface wave transmission line including tapered portion 40, main hollow portion 53, tapered portion 60, and reduced diameter portion 61. The energy of the surface wave may be essentially restricted to an annular region such as indicated at 70 in FIGURES 1 and 2 which may, for example, extend a distance of the order of one wavelength from the external surface of the line portion 53. The material such as grain or paper sheet or board which preferably fully occupies the volume 70 does not itself substantially affect the surface wave transmitted along the line, while any moisture associated with the material within this region will have a pronounced effect, particularly if a resonant absorption frequency for water is generated by the microwave generator 16. Detector 22 transmits to ratio meter 23 a signal which is a measure of the amount of power supplied to the transmission line section 53 while detector 64 transmits to the ratio meter 23 a signal which is a measure of the amount of microwave power transmitted through the material under test. The ratio of these two signals, as adjusted by the zero setting of the ratio meter attenuators or amplifiers, thus constitutes a measure of the power absorbed by the moisture content of the material and is found to give a relatively accurate measure of the moisture content of such material.

It is found that even though the cross sectional dimensions of the transmission line section 53 are of the order of the wavelength of the transmitted energy so as to provide a relatively rigid and self-sustaining unit, effective transmission of the surface wave takes place. The surface wave is launched by means of a launching device 30 having a relatively small inner conductor 34 which is then merged into the relatively large cross section transmission line section 53 by means of a tapering portion 40. Alternative locations for the input power and transmitted power detectors are indicated at 44 in FIGURE 1 and at 64a in FIGURE 5. It will be apparent that the sensing device 10 of FIGURES 1 and 2 may be readily inserted at a number of different points in a mass of material so as to obtain a number of readings of moisture content to insure obtaining a reliable measurement of moisture content for the entire mass of material.

The cross section of the transmission line section 53, which is principally responsible for the sensing of moisture content, may be selected solely on the basis of the type of material for which measurement is to be taken. For example, the section shown in FIGURE 2 would be preferred for use in the measurement of moisture in stacked paper sheets such as indicated at 12.

FIGURE 3 illustrates the cross section of a sensing device which may be entirely similar to that of FIGURES 1 and 2 except that the main transmission line section 53a thereof with its dielectric coating 69a has a cylindrical exterior surface so as to be coupled to an annular region of material under test as indicated by the dash line 70a, granular material being indicated at 75. The material 75 preferably completely fills the annular space 70a wherein the material may have a substantial influence on the transmitted surface wave. The launching and insertion ends of the transmission line section 53a would be substantially identical to those indicated in FIGURE 1, and the section 53a may be hollow to accommodate return lines 72 and 73 from the detector such as indicated at 64 in FIGURE 1.

FIGURE 4 illustrates a further modified cross section for the device of FIGURES 1 and 2 and in this case the main transmission line section 53b corresponding to section 53 in FIGURE 1 may have a rectangular external periphery for coupling to material in regions such as indicated at 70c and 70d for example. This configuration would have advantages in sensing moisture content of stacks of paper board or the like such as indicated at 77. Here again, the launching and insertion ends of the device would be substantially identical to those indicated in FIGURE 1 and return lines 72 and 73 have been indicated in the hollow interior of the member 53b as in FIGURES 1-3.

FIGURES 4 and 5 illustrate the case where the material under test is in direct contact with a metal conductive surface of the transmission line section 53b in FIGURE 4, or 53 in FIGURE 5, which preferably has a resistivity of about $10 \times 10^{-6}$ ohm-centimeters but less than a resistivity of $1000 \times 10^{-6}$ ohm-centimeters (volume resistivity at 0° C.). By way of example, the transmission line section 53b in FIGURE 4, or 53 in FIGURE 5, may be of stainless steel having a resistivity of about $100 \times 10^{-6}$ ohm-centimeters. Under these conditions, 75% of the energy of the surface wave transmitted along the line 53b in FIGURE 4, or line 53 in FIGURE 5, will be confined to a region extending to a distance of about 10 centimeters from the surface of the line as indicated by dash lines 70c and 70d in FIGURE 4 and by dash lines 70' in FIGURE 5. The showing of FIGURE 5 is, of course, directly applicable to the embodiment of FIGURE 4 in illustrating the terminal end of the transmission line section 53b and in illustrating the manner in which the volumes 70c and 70d of FIGURE 4 constrict at the terminal end of the waveguide section 53b where this section has a covering of dielectric material as indicated at 66 in FIGURE 5.

The surface wave transmission line section 53b of FIGURE 4 has sufficient wall thickness to be substantially rigid and self-sustaining. By way of example, the cross section as seen in FIGURE 4 may have a height dimension of about ½ wavelength and a horizontal dimension of about 1 wavelength where the surface wave is transmitted at a frequency of approximately 22,235 megacycles per second, a resonance absorption frequency for water. Under these conditions, the minimum wall thickness as seen in FIGURE 4 may be about 3/32 inch. The cross section of the transmission line 53b in FIGURE 4 or 53 in FIGURE 5 may be selected solely on the basis of the type of material for which measurement is to be taken. The dielectric coating 69 in FIGURES 1 and 2 and 69a in FIGURE 3 may of course be omitted as in the embodiments of FIGURES 4 and 5, and alternatively, the embodiments of FIGURES 4 and 5 may be provided with a suitable dielectric coating such as indicated at 69 in FIGURE 1 restricting the energy of the surface wave to a smaller region such as indicated at 70 in FIGURE 1.

FIGURE 6 illustrates a sensing device 10a similar to device 10 of FIGURE 1. The launching end of device 10a is substantially identical to that of FIGURE 1 and corresponding reference numerals have been assigned. In this embodiment the main surface wave transmission line section 80 has a solid cross section with an exterior periphery which may correspond to that of FIGURES 2, 3 or 4. The transmission line may have a tapering portion 81 at the launching end connecting with inner conductor 34a of a launching device 30a substantially identical to that of FIGURE 1. At the opposite end, the line tapers at portion 82 to a relatively small diameter conductor 83 imbedded within a dielectric material 85 corresponding to the dielectric material 66 in FIGURE 1.

A flaring conductive section 84 at the terminal end of the line may be identical to the flaring outer conductor portion 32a at the input end of the line and lead to a matching section 90. The matching section 90 may or may not have the transition to a rectangular waveguide as provided by portions 34a and 36a at the input end of the line. Thus, the termination end of the line could be an exact duplication of the input end except that a terminating power absorber would replace the microwave generator, or alternatively the line could terminate as a coaxial waveguide with the detector unit having the correct matching impedance to act as the absorbing termination of this coaxial waveguide. FIGURE 6 illustrates diagrammatically the case where a transition from a coaxial waveguide to a rectangular waveguide is provided with detector unit 91 acting as the absorbing termination with the correct matching impedance at the end of the rectangular waveguide.

The detector 91 is coupled to ratio meter 23 by means of a line 93 so that the ratio meter may register the ratio of the incident microwave energy to the transmitted microwave energy as a measure of the moisture content or the like. The test material may be located in the region indicated at 95 in FIGURE 6 which corresponds to the region of substantial influence of the surface wave transmitted along the line 80. The sensing device 10a is preferably dimensioned to be conveniently grasped by the hand at the casing 18 and at the matching section 90 and moved laterally of the transmission line into engagement with a test body 97 located at the region 95. The device 10a is particularly adapted to be pressed into intimate stable contact with the surface of a body of material to be analyzed. For this reason, the cross section of the transmission line section 80 preferably corresponds in exterior perimeter to the cross section of bar 53b in FIGURE 4 and has a flat planar undersurface 80a for conforming extended area contact with the body 97 whose moisture content is to be measured. Of course, if the body to be tested has some other surface configuration, the surface 80a preferably is correspondingly contoured so as to mate continuously with the surface of the body under test.

In each of the embodiment illustrated in FIGURES 4, 5 and 6, the main surface wave transmission line section 53, 53b and 80 is preferably of an imperfectly conductive metal such as stainless steel or an aluminum alloy having a resistivity substantially greater than the resistivity of copper so as to restrict the spread of the surface wave beyond the outside perimeter of the transmission line section to a distance of the order of 4 to 6 wavelengths, for example. For example, 75% of the energy of the surface wave may be within 10 centimeters of the external surface of the transmission line section for a wavelength of 1.35 centimeters. Further, the cross sectional dimensions of the transmission line section are preferably of the order of one wavelength and provide a substantially rigid and self-sustaining member. The detector means 22, 44, 44a, 64, 64a and 91 are preferably rigidly mounted in precisely determined spacial relationship to the surface wave transmission line. It will be understood that the embodiments of FIGURES 1 through 5 are preferably of a length to be conveniently manipulated and thus would normally not exceed six feet in length where the thickness or smaller overall cross sectional dimension of the main transmission line section is of the order of ¼" inch. If the embodiment of FIGURE 6 is to be manipulated by an operator grasping opposite ends of the unit, it will be understood that the unit will not normally exceed about four feet in length.

The device of FIGURE 6, for example, could, however, be handled by two people or could be mounted in a machine and be much longer than four feet, for example the full width of a paper machine.

The embodiments of FIGURES 1 through 5 could be substantially longer than 6 feet if the sensing device is to be operated in a vertical orientation rather than a horizontal orientation. In a horizontal orientation, the device is substantially rigid and self-sustaining if it can be held in a substantially horizontal orientation from one end thereof without a substantial amount of deflection of the opposite end. On the other hand, for a sensing device which is to be used in the vertical orientation, the device might deflect unduly if held in a horizontal orientation and yet be usable in the vertical orientation providing the device were sufficiently rigid so as to be forced into a mass of grain without buckling. Such a sensing device will herein be termed "effectively rigid."

In operation of the embodiment of FIGURE 6, the operator grasps the casing end 18 with one hand and the opposite end 90 with the other hand and presses the surface 80a into engagement with a matching surface of a test body such as indicated at 97. Amplitude modulated power may then be supplied to the microwave generator 16 which generates modulated microwave energy. This energy is coupled to the launching device 30a including central conductor 34a, rectangular waveguide 36a and launching horn 32a which transmits the energy as a surface wave along the external surface of the flaring portion 81 and along the external surface of the transmission line section 80. As in the previous embodiment, the inner conductor part 34a will have a diameter which is a small fraction of the wavelength. The tapering external surface portion 82 of the surface wave transmission line in conjunction with the dielectric material 85 imbedding this section tends to constrict the surface wave to a region closely adjacent the transmission line at 83. The energy which is coupled to the test material 97 is thus effectively coupled to the detector 91, and the matching section 90 is designed to prevent substantial reflection of the incident energy.

FIGURES 7 and 8 illustrate an embodiment of the invention particularly adapted for sensing moisture content or the like of travelling webs. In this embodiment, a web 110 of paper or the like travels over a roller 111 which may be suitably driven to rotate on its axis. The roll 111 is diagrammatically illustrated as having supporting shafts 113 and 114 journalled in suitable fixed bearings means 116 and 117.

Microwave energy is coupled to the travelling web 110 by means of an open wire transmission line 120.

If the roller 111 is of metal, a desirable field configuration is produced by the open wire 120 in conjunction with the adjacent metal surface of roll 111. The field configuration would be similar to that of one of the modes of a two conductor transmission line or of a conductor-ground plane transmission line. It would, of course, be immaterial whether the roller 111 were of solid or hollow construction. The diameter of such a metal roll 111 would be non-critical providing the diameter is large enough compared to the cross section of line 120 since the characteristic impedance of the transmission line would then be relatively independent of roll diameter. The spacing between the open wire 120 and the roller 111, would, however, affect the characteristic impedance of the transmission line, so that it is important that this spacing remain constant in operation. Variations in the characteristic impedance of the transmission line in operation would affect the launching efficiency of the launching device 122 and receiving device 123. While high launching efficiency of itself is not a critical factor in the measurement, it is, of course, important that launching efficiency remain constant during a measurement operation.

By way of example, if line 120 comprises an uncoated electrically conductive wire, a spacing between the line and the metal surface of roll 111 of from one millimeter to approximately 10 wavelengths would be usable. A spacing between one-half and two times the wavelength is preferred. Thus, where the system is employed for sensing moisture content and a resonant absorption wavelength of 1.35 centimeters is utilized, a spacing between about .7 and 2.7 centimeters is preferred, while a spacing up to about 15 centimeters would be usable.

Where the open line 120 comprises a conductive wire or the like having a dielectric coating or a modified surface, the energy of the field is effectively restricted, and the spacing between the line 120 and the metal surface of roller 111 could range from a minimum possible to a little more than one wavelength, while preferably the spacing would be less than one-half wavelength.

Alternatively, the roller 111 could have a surface of dielectric material. For example, a metal roller such as indicated at 111 in FIGURE 7 could have a thin dielectric coating thereon of any practical thickness for example one inch but preferably not less than ⅛ inch. The diameter of the roller in this case would not be critical but the dielectric surface of the roller preferably would not be less than one-half wavelength from the open line 120 unless the line 120 is also dielectric coated. With the open line 120 comprising an uncoated conductor, spacings between the outside diameter of the line 120 and the dielectric surface of the roller closer than one-half wavelength would tend to cause diffraction of the wave energy from the intended path. On the other hand, where the surface of the line 120 has a dielectric coating or is otherwise suitably modified to restrict the energy of the microwave field, spacings less than one-half wavelength between the line 120 and the dielectric surface of the roller would be satisfactory. Where the width of the roller 111 is not too great, it is possible to mount the coupling devices 122 and 123 directly on the fixed bearings 116 and 117. On the other hand with a web of paper of 20 x 30 feet in width, it is preferred to couple the microwave energy to a part only of the width of the web. As illustrated in FIGURE 7, this may be accomplished by providing a pair of small wheels 131 and 132 for maintaining a predetermined desired spacing between the open line 120 and the surface of roller 111. The wheels 131 and 132 are illustrated as being mounted by means of ball bearings 135 and 136 on the flaring sections 137 and 138 of the coupling devices 122 and 123. Alternatively, the wheels may be mounted as indicated at 131a and 132a on constant diameter sections 141 and 142 of the coupling devices 122 and 123. Thus, as illustrated in FIGURE 8, if roller 111 is driven as indicated by arrow 150 to move the web 110 in the direction of arrows 151 and 152, the wheels such as 131 may rotate as indicated by arrow 153. While the coupling devices 122 and 123 are stationary.

By way of example, the coupling devices 122 and 123 may be maintained in their desired relation to the roller 111 by means of brackets 161 and 162 carried on the fixed bearing means 116 and 117 and receiving integral extensions 120a and 120b of the line 120. The integral extension portions 120a and 120b may be secured to brackets 161 and 162 by any suitable means such as diagrammatically indicated at 165 and 166, which preferably provides for vertical adjustment as diagrammatically indicated by the narrow vertically elongated slots 161a and 162a having less width than means 165 and 166. The tension of the wire 120a, 120, 120b may be adjusted by any suitable means, for example by means of a narrow horizontally elongated slot 162b in bracket 162 in conjunction with a clamping screw 169. The wires 120a and 120b may be suitably secured to end walls 171 and 172 of coupling devices 122 and 123, if desired, to fixedly determine the spacing between the launching device 122 and the receiving device 123.

As indicated, the large diameter ends of the flaring portions 137 and 138 may be closed by dielectric windows 175 and 176 to prevent entry of dust and other foreign matter. The windows 175 and 176 might also serve to maintain the proper orientation of the coupling devices 122 and 123 with respect to the line 120 and to rigidly position the line 120 relative to the surface of web 110.

Simply by way of example, the launching device 122 has been illustrated as being energized from a modulated microwave source 180 through a variable microwave attenuator 181 and a microwave power divider 182. A portion of the output of the power divider 182 is fed to a coaxial input terminal 183 of launching device 122, while a further portion of the output of the power divider 182 is delivered to a microwave detector 185 and thence to a first input of a comparator or ratio meter component 186. A coaxial output terminal 190 of receiving device 123 is coupled through a microwave detector 191 with a second input of the comparator 186, so that the comparator 186 provides a measure of the difference or ratio between the power supplied to the launching device 122 and the power received from the receiving device 123. Thus the comparator 186 may provide an indication of moisture content or the like as described in the preceding embodiments.

FIGURE 9 illustrates a modification of the embodiment of FIGURE 7 wherein a tubular metal roller 211 has mounting shafts 213 and 214 journalled in fixed bearing means 216 and 217. In this embodiment, the roller is illustrated as having a dielectric coating 218 which may be of any practical thickness for example one inch but preferably not less than ⅛ inch. The roller 211 is driven by any suitable means to transport a web 220 whose moisture content or the like is to be determined. An open wire line 122 extends in rigidly spaced relation to the roller 211 and serves to guide microwave energy into coupling relation to the web 220. Where the line 222 comprises a wire having an uncoated conductive surface, preferably the external surface of line 222 is at least one-half wavelength from the dielectric surface of roller 211. On the other hand, if the line 222 has a dielectric coating or is otherwise modified to restrict the spread of energy of the microwave field, the spacing between the dielectric surface of roll 211 and the dielectric surface of line 222 could be less than one-half wavelength. Of course, the dielectric coating 218 on the roll 211 may be omitted as in the embodiment of FIGURE 7, in which case with an uncoated line 222 a spacing of from 1 millimeter to approximately 10 wavelengths or about 15 centimeters would be usable with a preferred spacing between about one-half and about two times the wavelength.

The embodiment of FIGURE 9 may utilize the electrical components indicated at 180, 181, 182, 185, 186 and 191 in FIGURE 7 and in this case line 230 in FIGURE 9 would be connected to one output of the power divider component 182 and line 231 in FIGURE 9 would be connected to the input of microwave detector unit 191 in FIGURE 7. In FIGURE 9, however, the line 230 leads to an input coaxial line section 235 which is coupled to the open line 222 by means of a tapering dielectric section 236. Similarly a flaring dielectric section 238 couples the energy from the open line 222 to coaxial line 240 which is connected with line 231.

If the roller 211 is not of excessive width, the open line section 222 may be supported directly from bracket 243 and 244 which are secured to the bearing means 216 and 217. On the other hand, as in the embodiment of FIGURE 7, rotatable wheels 251 and 252 may be provided for supporting the coaxial line sections 235 and 240 adjacent the point where they are coupled to the open line 222. The wheels 251 and 252 may have fixed annular members such as indicated at 255 secured to the outer conductor portions such as 256 of the coaxial cables and be mounted by means of ball bearings such as indicated at 258. Suitable adjustment means may be provided as indicated by narrow horizontally elongated slot 260 associated with bracket 244 and clamping screw means 265 for adjusting the tension of the transmission line sections between the brackets 243 and 244. Suitable means may also be provided for adjusting the vertical position of the transmission line sections 235, 222 and 240, for example shim plates 262 and 263 interposed between brackets 243 and 244 and the fixed bearing means 216 and 217.

FIGURE 10 illustrates an embodiment which may be identical to an embodiment of my copending application Serial No. 710,766 filed January 23, 1958. The arrangement of FIGURE 10 may measure moisture content or the like of a flowable material capable of being confined within a suitable tube such as indicated at 310. One or more single conductor surface wave guides such as indicated at 311 may be inserted axially of the tube 310 so as to sense the moisture content of material adjacent to the wire by transmitting microwave energy along the wire in the same manner as illustrated in FIGURE 1 of my copending application Serial No. 710,766.

As described in said copending application Serial No. 710,766, the waveguide 311 may comprise a wire preferably having an exterior surface which is a good electrical conductor, rather than a semi-conductor or insulator. For example, the wire may be of hardened steel. Alternatively, the wave guide 311 may comprise a metallic conductor having a thin coating of wear resistant material, a suitable coating being an aluminum oxide ceramic known as "Rockide." In the case of an open wire wave guide of this type, the microwave energy will surround the guide and extend approximately the distance of one wavelength from the external surface of the guide.

It is found that when microwave power is transmitted along a waveguide such as 311 and a body of solid material is disposed in close proximity to the waveguide, any moisture carried by the material will produce a power loss which will provide a measure of the moisture content of the material. The term "microwave" as used herein refers to radio frequency wavelengths of the order of a few meters or less. The present invention particularly involves wavelengths of 2.5 centimeters or less in the radio frequency spectrum. It has been discovered that a certain critical frequencies in the microwave region, for example 22,235 megacycles per second, the microwave energy transmitted along a wave guide is relatively unaffected by the material itself while being critically sensitive to the moisture content of the body of material. The critical frequencies where absorption due to moisture or other constituent being sensed is at a maximum will be termed herein "resonance absorption frequencies."

As disclosed in my copending application Serial No. 710,766, a microwave source such as indicated at 314 in FIGURE 10 may deliver microwave power, for example at a resonance absorption frequency for water, to a suitable coupler or wave launcher 315 for projecting the energy along the open waveguide 311. The microwave energy entering the tube 310 and leaving the tube 310 may be measured by means of suitable microwave power sensing means 320 and 321 to obtain a measure of the energy absorbed by the material surrounding the conductor 311 within the tube 310. The sensing means 320 and 321 are disposed in coupled relation to the waveguide 311 and are suitably separated in terms of the power loss to be measured. These sensing means may comprise bolometers, crystal detectors or the like either capacitively or inductively coupled to the microwave energy travelling along the wave guide 311. The output from the sensing means 320 and 321 may be compared by any suitable electrical means to obtain a measure of the power absorbed by the moisture contained in the material. For example, the outputs from the sensing means 320 and 321 may be delivered to a suitable ratio meter such as indicated at 325 or bridge such as is commonly utilized to measure microwave standing wave ratios. An example of a suitable commercially available instrument is the Hewlett-Packard ratio meter Model 416A. Beyond the second sensor 321, suitable absorbing means 327 may be provided such as water for preventing reflection of the microwave energy. The meter 325 may be provided with a suitable scale for indicating a numerical value related to the power absorbed by the material, for example a difference or ratio between the output of the sensing means 320 and the output of the sensing means 321 may be indicated by the meter. The meter may be zeroed by projecting microwave energy along the waveguide 311 in the absence of the material or with a completely dry material within the tube 310.

In certain cases, a solid metallic conductor such as indicated at 311 may be inserted through a solid material to obtain a measure of the moisture content or the like thereof in the same manner as for a flowable material within a tube such as indicated at 310 in FIGURE 10.

FIGURE 11 is a diagrammatic illustration of this embodiment wherein the solid metallic conductor 311 has been inserted through a body of solid material indicated at 335. As an example of a manner in which the conductor 311 may be inserted through a body of solid material, a hole may be produced which extends through the body 335 and is of diameter to snugly receive the conductor 311, and the conductor 311 may be inserted into the hole and through the body of material as indicated in FIGURE 11.

FIGURE 12 illustrates an embodiment similar to that of FIGURE 10 wherein a tube 410 of metal or dielectric material guides a granular or liquid material, for example in the direction of arrow 411 along the length of the tube. As in the embodiment of FIGURE 10, moisture content or the like of the flowable material may be measured. One or more single conductor surface waveguides such as indicated at 413 may be inserted axially of the tube section 410 so as to sense the moisture content of material adjacent to the wire by transmitting microwave energy along the wire. The waveguide 413 may comprise a wire preferably having an exterior surface which is a good electrical conductor, rather than a semi-conductor or insulator. For example, the wire may be of hardened steel. Alternatively, the waveguide 413 may comprise a metallic conductor having a thin coating of wear resistant material, a suitable coating being an aluminum oxide ceramic known as "Rockide." In the case of an open wire waveguide of this type, microwave energy will surround the guide and extend approximately the distance of one wavelength from the external surface of the guide.

The launching and detecting components for the system of FIGURE 12 may be the same as those indicated in FIGURE 7 including coupling devices 122 and 123 and electrical components 180, 181, 182, 185, 186 and 191. Alternatively, the open line 413 may extend through suitable dielectric windows in the tube walls, and detectors such as indicated at 320 and 321 in FIGURE 10 may be coupled to the surface wave energy of the line at the exterior of the tube 410 where the surface wave energy enters and leaves the tube respectively.

A still further alternative arrangement, however, has been specifically illustrated in FIGURE 12 wherein the tube 410 has a metal wall and coaxial coupling devices 420 and 421 extend into the interior of the tube 410. The dielectric material of the coaxial launching sections 420 and 421 may taper as indicated at 424 and 425. It will be understood that the rate of feed of the material to the tubular section 410 may be such that the granular or liquid material will fully occupy the effective volume surrounding the line 413 within which moisture content or the like of the flowing material would have a substantial effect on the microwave signal transmitted along the line.

The transmission line section 413 may advantageously be what will herein be termed an "imperfect conductor" and have a resistivity of at least about $10 \times 10^{-6}$ ohm-centimeters but less than about $1000 \times 10^{-6}$ ohm-centimeters (volume resistivity at 0° C.). With a resistivity of the order of steel, for example about $100 \times 10^{-6}$ ohm-centimeters, about 75% of the energy of the surface wave transmitted along the line 413 will occupy a region extending to a distance of about 10 centimeters from the line (for a wavelength of 1.35 centimeters). In the embodiment of FIGURE 12, the energy of the surface wave transmitted along the line 413 is preferably restricted as by the use of an imperfect conductor such as steel for the line so as to avoid any substantial effect on the field by the metal wall of the tube section 410.

In the embodiment of FIGURE 12, the transmission line 413 receives power from a modulated microwave source 430 via a power divider component 431. A microwave detector 432 receives a predetermined portion of the output from the power divider component 431 and delivers a signal via variable attenuator component 434 to one input of a null balance motor system indicated at 435. A second microwave detector component 437 is connected to the coupling device 421 and delivers its output to a second input of the null balance system 435. The null balance system may comprise any suitable means for generating an error signal when the two inputs to the system are unequal, which error signal may drive a suitable reversible motor means coupled to the variable attenuator component 434 as indicated by line 440. The motor may be connected in such a manner that when the input to component 435 from attenuator 434 exceeds the input from microwave detector 437, the motor drives the attenuator via coupling 440 in such a direction as to increase the attenuation of the signal from detector 432 until the two inputs are again equal. Similarly, if the input from detector 437 exceeds the input from attenuator 434, the motor will be driven in the opposite direction to decrease the attenuation of the signal from detector 432 so as to continuously maintain the outputs from attenuator 434 and detector 437 in a state of equality. The setting of the variable attenuator 434 will then be a continuous indication of the amount by which the input power to line 413 exceeds the transmitted power, and this in turn is an indication of moisture content or the like of the material flowing in tube 410. The motor of system 435 which drives variable attenuator 434 may also drive a suitable chart recorder 442 as indicated by coupling line 443 to provide a continuous record indicative of the time variation of moisture content or the like within the tube section 410.

FIGURE 13 illustrates an embodiment of the present invention wherein microwave power is generated at a suitable source 510 which may utilize a reflex velocity modulated tube such as a "Klystron" and is delivered by means of a waveguide 511 to a suitable coupler or wave launcher 513 for projecting the energy along the open waveguide 515. The waveguide 515 may comprise an electrically conductive wire completely imbedded in a suitable solid dielectric material such as "Teflon," "Kel-F" or the equivalent, but in any event the open waveguide structure is such that a substantial portion of the wave energy is caused to travel along a region in communication with free space into which the body whose moisture content is to be determined may be inserted. For example, as illustrated in FIGURE 13, the dielectric material indicated by the dash outline 516 may be cut away as indicated at 517 to receive a moving web 518 of paper or other material. In the case of an open wire waveguide, the microwave energy will surround the guide 515 and extend approximately the distance of one wavelength from the guide surface.

In order to obtain an electrical indication of the amount of power absorbed by the paper web 518 and thus to obtain an indication of the moisture content thereof, suitable microwave power sensing means 520 and 521 may be disposed in coupled relation to the waveguide 515 at opposite sides of the body 518 to be tested. These sensing means may comprise bolometers, crystal detectors or the like either capacitively or inductively coupled to the microwave energy traveling along the waveguide 515. The output from the sensing means 520 and 521 may be compared by any suitable electrical means to obtain a measure of the power absorbed by the moisture contained in the paper web 518. For example, the outputs from the sensing means 520 and 521 may be delivered to a suitable ratio meter or bridge such as is commonly utilized to measure microwave standing wave ratios. An example of a suitable commercially available instrument is the Hewlett-Packard Ratio Meter Model 416A. Beyond the second sensor 521, suitable absorbing means 525 may be provided such as water for preventing reflection of the microwave energy. A suitable meter is indicated diagrammatically at 523 which may be provided with a suitable scale for indicating a numerical value related to the power absorbed by the paper 518, for example the difference or ratio between the output of the sensing means 520 and the output of the sensing means 521 may be indicated by the meter. This output of the bridge 523 may be compared with the output of the bridge in the absence of the web 518 or with a completely dry web substituted for the web 518 to obtain a measure of the moisture content of the web.

Figure 14:
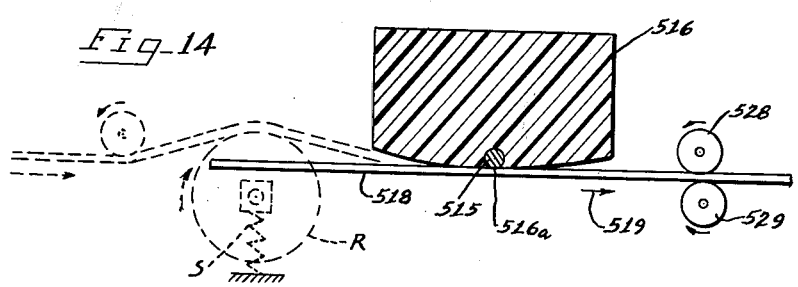
FIGURE 14 is a somewhat diagrammatic cross sectional view of the system of FIGURE 13.

FIGURE 14 illustrates the case wherein the cylindrical conductive wire 515 which serves as the waveguide is completely imbedded in the dielectric material 516 which serves to restrict the spread of the microwave energy substantially to a distance of the order of a wavelength from the conductor surface. The web 518 travels in the direction of the arrow 519 by means of suitable feed rolls 528 and 529 and rides against a lower surface 516a of the dielectric material 516 in coupled relation to the microwave energy associated with the waveguide 515. Suitable means, of course, may be provided for insuring proper stable contact of the web 518 with the surface 516a as it travels thereacross so as to present a uniform volume of the web 518 in coupled relation to the waveguide 515. For example, the web 518 may be held taut so as to be pressed against surface 516a, or the web may be wrapped about surface 516a by the use of a guide roller indicated in dotted outline at R in conjunction with means maintaining suitable web tension indicated diagrammatically in FIGURE 14 as a compression spring S urging roller R upwardly. The web 518 may be entirely within a distance of one wavelength from the surface of the wire 515, or a predetermined portion of the thickness of the web 518 may be within this distance from the waveguide 515.

Figure 15:
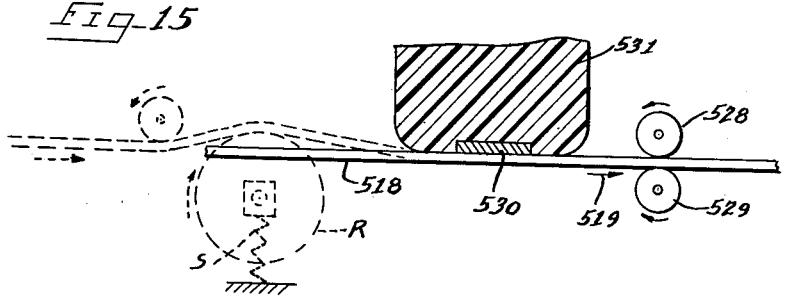
FIGURE 15 is a fragmentary somewhat diagrammatic cross sectional view similar to that of FIGURE 14 but illustrating the use of a surface wave transmission line having a flat planar surface for guiding energy as a surface wave in coupling relation to a travelling web.

FIGURE 15 illustrates a slightly modified waveguide means wherein a flat conductive bar 530 is imbedded in a dielectric material 531, and the web 518 travels across a surface of the bar 530, for example. In this case, the coupler 513 may take the form of a rectangular horn configuration, rather than a cylindrical horn configuration such as might be utilized with the cylindrical wire 515 illustrated in FIGURE 13. The embodiment of FIGURE 15 is otherwise identical to the embodiment of FIGURES 13 and 14, so that further illustration or description is deemed unnecessary.

FIGURES 16 and 16A illustrate embodiments which may be entirely identical to the embodiment of FIGURES 13 or 15 with the exception that the wire or bar waveguide means 535 and dielectric medium 536 define a somewhat curved path so that the microwave energy is guided past a suitable body whose moisture content is to be determined. The body may be a moving web as indicated at 537 in FIGURE 16 or separate articles as indicated at 538 in FIGURE 16A carried by a conveyor 539. The web 537 may have a width substantially greater than the span of line 535 between detectors 520 and 521 and may be in sliding contact with an extended area smooth surface 536a provided by dielectric medium 536. The line 535 and dielectric medium 536 may have a cross section as indicated in FIGURE 14 or 15. In FIGURE 16A, conveyor 539 may travel transversely of line 535 and may be stably supported in rigidly fixed relation to line 535 as indicated in FIGURE 16A in dash outline. For example, reference letter G may designate a channel-like guide for supporting the conveyor 539 in stable sliding relation and the guide may be fixedly secured to dielectric material 536 to rigidly position articles 538 in stable coupling relation to line 535. In FIGURE 16, the sensing system may be moved transversely as indicated by double arrow D if desired to scan the entire width of the moving web. Corresponding reference numerals have been given to corresponding parts in FIGURES 13 and 16, so that further description of the embodiments of FIGURES 16 and 16A is unnecessary.

FIGURE 17 illustrates a somewhat modified system wherein a web of material or the like designated by the reference numeral 518 travels in energy absorbing relationship to microwave energy conducted along a waveguide 540. By way of example, the waveguide 540 may comprise a member of conductive material such as a stainless steel wire, bar, rod or the like with or without a dielectric coating. A dielectric coating serves to restrict the spread of microwave energy substantially to a distance of the order of a wavelength from the conductor as previously mentioned. Microwave energy may be delivered to the waveguide 540 by means of a suitable completely enclosed waveguide means 542 which is connected with a two-way coupler 543 for coupling a predetermined proportion of the energy from the source 510 to a waveguide 544, variable attenuator 545, microwave energy sensing means 547 and absorbing termination 548 which serves to absorb the energy and prevent reflection. The microwave energy sensing means 547 may comprise a crystal, barretter, or bolometer and may deliver a D.C. or intermediate frequency output by means of a suitable conductor 550 to a suitable comparison circuit 552. A portion of the energy from the source 510 is transmitted through the coupler 543 and a waveguide 555 to a suitable coupler 557 for projecting the energy along the open waveguide means 540. The energy which is not absorbed by the material 518 may be sensed by suitable means 560 such as a crystal detector, barretter or bolometer whose output is delivered by means of a conductor 561 to the comparator circuit 552 which may be a suitable D.C. or intermediate frequency bridge circuit to provide an output reflecting the difference or ratio between the inputs from 550 and 561, for example. A suitable termination 563 is indicated for absorbing the microwave energy and preventing reflection. By comparison of the readings at the meter 552 with a moist web 518 and with a completely dry web coupled to waveguide 540, an indication of the power absorbed by the moisture contained in the web is obtained.

It will be understood that in FIGURE 17, the imperfect conductor 540 may be located in free space with no surrounding solid dielectric material, and suitable means may be provided for maintaining the material 518 in proper stable energy absorbing relation to the energy traveling along the wire 540. For example the web 518 may be supported by an extended flat planar surface 566a of support member 566 which is mounted in rigidly fixed relation to coupler 557, line 540 and detector 560 as indicated by dash lines 567 and 568 in FIGURE 17. The member 566 may be outside the effective field of line 540 or within such field and may be of metal or dielectric material.

Where the line 540 has a conductivity of between $10 \times 10^{-6}$ ohm-centimeters and $1000 \times 10^{-6}$ ohm-centimeters, for example $100 \times 10^{-6}$ ohm-centimeters, the material would have to have a very substantial thickness such as 10 to 20 centimeters to place surface 566a out of the effective field of the line 540. Such thick material might be supported by a conveyor such as indicated at 539 in FIGURE 16a. Alternatively the surface 566a and web 518 thereon may be spaced a wavelength or more from the line 540.

In FIGURE 18, the microwave generator 510, waveguide 511 and coupler 513 may be similar to those utilized in FIGURE 13, while the open waveguide means 580 may comprise either a wire or bar of conductive material in free space, for example as described in connection with FIGURE 17. The web 518 may be moved past the wire in stable energy absorbing relation thereto as in the previous embodiment. A suitable microwave energy sensing means 582 is provided in coupling relation to the waveguide 580 for delivering its output to a suitable intermediate or audio frequency amplifier 583, a calibrated intermediate or audio frequency attenuator 584 and a level indicator 585. A suitable absorbing termination 587 may be provided terminating the waveguide 580 to prevent reflection.

With this system, a suitable level output may be selected by means of the level indicator 585 with a perfectly dry web occupying the position of the web 518, and thereafter with the web 518 in the indicated position, the attenuator 584 is adjusted to restore the previous level at the indicator 585, whereupon the setting of the attenuator 584 will provide a numerical indication of the energy absorbed by the moisture in the web 518. Attenuator 584 may be controlled automatically by a null balance system to maintain the input to indicator 585 at any desired level. This corresponds to providing a constant level to the second input of component 435 in FIGURE 12.

It will be noted that in each of the embodiments, the microwave energy may be projected across the entire width of the travelling web or the like so as to obtain an average of the moisture content across the web. Waveguide means producing a relatively uniform field over a predetermined area of the body under test is preferred, and for this reason the bar configuration of FIGURE 15 is preferred for use with flat webs in a planar condition.

It will be understood that the method of the present invention may comprise projecting a surface wave along a predetermined path with the surface wave impinging on a region accessible to free space, supporting the body whose moisture content is to be determined in said region, and obtaining an electrical indication from which the amount of energy absorbed by moisture in the body may be determined. The term "open waveguide" will be utilized to describe a waveguide such as illustrated in the present embodiments wherein a side or region along the waveguide is accessible to free space. The term "surface wave" will be utilized to refer to wave energy conducted along a surface sharply separating two media of different electric properties such as to exert a guiding effect on the electromagnetic wave. The surface separating a conductor from an insulator, or the surface separating two different insulators of markedly different dielectric constants may be utilized. Such surfaces will herein be termed "surface wave transmission lines" when utilized to guide microwave energy as a surface wave. It will be appreciated that the method of the present invention is particularly applicable to materials which absorb relatively little microwave power at one or more frequencies which frequencies are readily absorbed by moisture contained in or on the material. The term "moisture content" is utilized herein to comprehend moisture contained either on the surface of the material or in the material, or both.

The present invention is, of course, applicable to determining the moisture content of stationary as well as moving webs. Generally, the invention is directed to detecting the moisture content of non-metallic inorganic materials and organic materials. It is contemplated that the invention will have particular application to cereals, dried foods, flour, breakfast foods, bakery mixes, dehydrated proteins, carbohydrates and cellulose materials.

In each of the embodiments, the microwave generating means preferably generates a frequency which is a resonant frequency with respect to the constituent of the material to be sensed while the frequency is such as to be relatively unaffected by the material itself. While troubles from standing waves due to reflection of microwave energy do not seem to be serious with single conductor surface wave transmission lines, each of the microwave generating means of the disclosed embodiments may generate a frequency modulated microwave signal so as to average out any small effects which may exist. Frequency modulation will reduce the criticality of the thickness of the dielectric coating on the transmission line where such is provided and will reduce the effects of variations in this thickness along the length of the line. By way of example for sensing moisture content in any of the illustrated embodiments, the frequency of the microwave generator may be varied over a range of 1250 megacycles per second, for example between 21,500 and 22,750 megacycles per second. The microwave power in any of the embodiments may be generated by means of a suitable Klystron having a cavity whose dimension may be varied by mechanical means. The mechanical means may be controlled by means of a solenoid energized so as to cyclically vary the frequency generated by the Klystron over a frequency range such as indicated above. If crystal detectors are utilized, pulse modulation may be introduced to provide an electrical variation of the power supply to the Klystron at a suitable low frequency rate. The Klystron electric supply power may be varied in step with the mechanical variation of the cavity as needed to maintain operation of the Klystron at substantially constant power level. A suitable attenuator for adjusting the power transmitted from the Klystron may also be provided in each of the embodiments. The disclosure of my copending application Serial No. 710,766 with reference to frequency modulation is incorporated herein by reference.

In each of the embodiments described or shown in the drawings, the waveguide may comprise a member having an exterior surface which is a good electrical conductor, rather than a semi-conductor or insulator. For example, the member may be of hardened steel and be in sliding contact with the material under test depending upon the nature thereof. Alternatively, in each of the embodiments, the waveguide may comprise a metallic conductor having a thin coating of wear resistant material which may be in sliding contact with the material under test, a suitable coating being an aluminum oxide ceramic known as "Rockide." In the case of an open wire waveguide of this type, the microwave energy will surround the guide and extend approximately the distance of one wavelength from the external surface of the guide.

In each of the embodiments where there is a dissymmetry with respect to the dielectric constant of materials in the space about the transmission line, velocities may be equalized as disclosed in my copending application Serial No. 710,766 to reduce radiation from the line to a desired minimum. For example the embodiments of FIGURES 14 and 15 may be modified as illustrated in FIGURES 2 through 10 or 13 of said copending application, and these disclosures are specifically incorporated herein by reference. For example the lower surface of bar 530 in FIGURE 15 may be modified by means of transverse grooves in the lower surface thereof as illustrated in said copending application Serial No. 710,766 to tend to equalize wave velocities at the upper and lower sides of the bar 530. In this case, the web 518 would be in direct sliding contact with the grooved metal surface of the bar 530. Alternatively, a second dielectric material could be provided as a thin coating on the undersurface of bar 530 as disclosed in said copending application having a substantially higher dielectric constant than the relatively massive dielectric material 531. This second dielectric material may be of a very hard ceramic material or alumina known as "Rockide." By way of example the bar 530 may be of copper in this instance, and the dielectric material 531 may be of "Teflon." The second dielectric material might have a thickness of the order of .0545 centimeter and a dielectric constant of the order of 80, for example.

It will be understood that in general the detecting means and electrical components of one embodiment may be applied to any of the other embodiments and such variations should be considered as specifically disclosed herein.

The present application is a continuation in part of my copending application Serial No. 644,394 filed March 6, 1957 and of my copending application Serial No. 710,766 filed January 23, 1958. The disclosure of my copending applications Serial Nos. 644,394 and 710,766 and of my copending application Serial No. 753,987 filed August 8, 1958 is specifically incorporated herein by reference to illustrate further embodiments for sensing a constituent of material.

The term "conductor" is used herein in a broad sense to include good conductors and semi-conductors but to exclude dielectrics, or non-conductors of electricity.

The term "transmission line" is used herein to cover waveguides generally regardless of cross-section, and is intended to comprehend waveguides of either conductive or dielectric material. The term "constituent of material" is intended in its broadest sense to cover substances within a material capable of differentially affecting microwave energy. The constituent may, of course, be an impurity rather than a normal part of the body of material.

In FIGURES 1-6, it will be understood that launching portions 32 and 32a and receiving portion 84 are of circular cross section. Where the cross section of the main part of the transmission line is non-circular, as in FIGURE 2 or 4, a horizontal section of tapering line portions 40 and 60, FIGURE 1, or 81 and 82, FIGURE 6, would be entirely similar to the vertical sectional views of FIGURES 1 and 6, except that the taper would be at a somewhat steeper angle to reach a greater final transverse dimension over the axial length of the taper. Of course, other suitable coupling means may be employed.

In my copending application Serial No. 644,394, an embodiment is disclosed in FIGURE 5 of the drawings thereof which is specifically incorporated herein by reference. In this embodiment, it is contemplated that the web will be in spaced relation to the external surface of the surface wave transmission line which may for example be in the form of a stainless steel wire, bar, rod or the like. The web is either wholly within a distance of one wavelength, for example 1.35 centimeters, from the external surface of the line or some portion of the web thickness may be within this distance. As shown in FIGURE 5 of said copending application, the web may be at such a level that if its general plane were extended horizontally, it would intersect the mouth of the launching horn (57, FIGURE 5 of Serial 644,394). In such a case, the imperfect conductor defining the surface wave transmission line may be surrounded entirely by free space with no dielectric material contacting the line. Suitable means which may be represented as a surface in dash outline underlying the web and generally coextensive with the web in the direction across the web may be provided for maintaining the web in proper stable energy absorbing relation to the energy travelling along the surface wave transmission line. Such embodiment could be identical to either the embodiment of FIGURE 17 or 18 hereof with respect to launching horns 513 and 557, receiving horns 513a and 557a, and the other electrical components.

FIGURE 19 illustrates an embodiment in accordance with the present invention wherein a sensing head 600 for sensing a constituent of material or the like is mounted on a traversing carriage 610 for traversing movement along the width dimension of a moving web 612 as generally indicated by the double headed arrow 614. The web 612 is indicated as travelling in contact with the underside of a suitable web support such as a roll or the equivalent. In FIGURE 19, a roll 620 is specifically illustrated which is rotatable in suitable bearings on a pedestal or machine frame comprising parts 622 and 623. The machine frame parts 622, 623 are shown as being rigidly secured to a floor or equivalent rigid structure diagrammatically indicated at 625.

The traversing carriage 610 is indicated diagrammatically as being mounted for transverse movement along a suitable track or guide means 630 rigidly secured to the structure 625. The track or guide means 630 thus serves to maintain the sensing head 600 in rigidly spaced relation to the surface of web 612 where the web is supported by the roll 620. It is contemplated that the angle at which the web approaches and leaves the roll 620 will also be precisely determined so that the portion of the web within the field of the sensing head 600 will remain constant as the traversing carriage 610 moves the sensing head across the width of the web. For example, where the roll 620 has a metal conductive external surface and the surface wave transmission line 630 has an exterior surface of steel or the like, the system may serve to maintain the spacing between the external surface of the line 630 and the metal external surface of roll 620 at a fixed distance which is preferably equal to less than ten times the wavelength of the microwave energy transmitted along the line 630.

The roll 620 may be provided with a suitable coupling as indicated at 632 so as to be driven by suitable means if desired. The roll 620 is of course precisely mounted so as to precisely maintain the level of the web relative to the level of the sensing head 600 across the entire width of the web 612.

Suitable means may also be provided for causing the traversing carriage 610 to be moved back and forth along the guide means 630 at a desired speed so as to cyclically scan the entire width of the web 612 if desired.

In the embodiment of FIGURE 19, it is preferred to have the axis of the sensing head 600 parallel to the axis of the roll 620 and directly below the region of contact between the web 612 and the roll 620. Thus, for the illustrated vertical orientation in FIGURE 19, where the web 612 engages the roll 620 over a substantial arc on each side of the lowest part of the roll, the axis of the sensing head 600 is preferably directly vertically below the central axis of roll 620.

FIGURE 20 illustrates one form of sensing head for use in the embodiment of FIGURE 19 which is similar to embodiments disclosed in my copending application Serial No. 753,987 filed August 8, 1958. The sensing head of FIGURE 20 may comprise a horizontal metal plate 650 rigidly secured to the framework parts 653 and 654 of traversing carriage 610 by any suitable means. Arms 657 and 658 which may also be of metal plate construction are illustrated as rigidly secured to the plate 650 and as supporting a surface wave transmission line assembly 660 at the upper ends thereof. By way of example, the surface wave assembly 660 may comprise a cylindrical core 662 secured at its opposite axial ends to the arms 657 and 658. The core exterior may have a helical groove formed therein as indicated at 664 for receiving the surface wave transmission line 630 as a helical coil.

In the illustrated embodiment, microwave energy is delivered to the line 630 from a microwave source 670 via a rectangular waveguide 671 and a coupling device 673. At the opposite end of the line 630 a coupling device 675 couples the transmitted microwave energy to a rectangular wave guide 676 having a suitable non-reflecting termination 678. Suitable detector means are indicated at 680 and 681 coupled to the waveguide 671 and 676 for sensing the input and transmitted power of the system. A suitable amplifier is indicated at 685 coupled to the outputs of the respective detectors as indicated by lines 686 and 687 for obtaining a difference signal to be delivered to a servo motor 690 via a line 691. The servo motor 690 is coupled as indicated by dash line 693 to a variable attenuator 695 associated with the detector 680 so as to maintain the outputs from detectors 680 and 681 equal. The detectors 680 and 681 have been indicated as crystals 697 and 698 associated with suitable directional couplers 699 and 700.

The metal frame parts such as 650, 657 and 658 may, of course, be sufficiently spaced from the entering transmission line section 630a and the leaving transmission line section 630b and the coil part 630c so as to be substantially outside of the influence of the microwave energy associated with the line. In the alternative, suitable microwave absorbing means may be provided such as indicated by the dash line 702 for effectively isolating all of the interfering surfaces from the energy of the line. A suitable microwave absorber is known as "Eccosorb." Preferably, the transmission line assembly 660 is spaced a greater distance from the support plate 650 than from the web indicated at 612. It is contemplated that the surface layer of the roll 620 indicated at 620a in FIGURE 20 which engages and supports the web 612 may be of either a metal or dielectric material.

By way of example, if line 630 comprises an uncoated electrically conductive wire of a material such as steel, a spacing between the line and the metal surface 620b of roller 620 of from approximately 1 millimeter to approximately 10 wavelengths would be usable. A spacing between one-half and two times the wavelength is preferred. Thus, where the system is employed for sensing moisture content and a resonant absorption wavelength of 1.35 centimeters is utilized, a spacing between about .7 and 2.7 centimeters is preferred, while a spacing about 1 millimeter to about 15 centimeters would be usable.

Where the line 630 comprises a conductive wire or the like having a dielectric coating or a modified surface, the energy of the field is effectively restricted, and a spacing between the line and the metal surface 620b could range from the minimum possible to a little more than 1 wavelength, while preferably the spacing would be less than ½ wavelength.

Alternatively, the roll 620 could have a surface layer 620a of dielectric material. A thin coating on the roll of any practical thickness for example 1 inch but preferably not less than ⅛ inch would be suitable. As in the embodiment of FIGURE 7, the diameter of the roll 620 would not be critical where such diameter is large in comparison to the cross sectional dimensions of the line 630. The dielectric surface corresponding to surface 620b in FIGURE 20 preferably would not be less than ½ wavelength from the line 630 unless the line 630 is also dielectric coated. With the line 630 comprising an uncoated conductor of steel for example spacings between the outside diameter of coil 630c and the dielectric surface of the roll 620 closer than ½ wavelength would tend to cause diffraction of the wave energy from the intended path. On the other hand, where the surface of the line 630 has a dielectric coating or is otherwise suitably modified to restrict the energy of the microwave field, spacing less than one-half wavelength between the line and the dieltctric surface of the roll would be satisfactory.

FIGURE 21 illustrates a sensing head 600 which may be identical to the head of FIGURE 20 but which is arranged so that its axis is generally parallel to the direction of movement of the web 612 which direction of movement is indicated by arrow 720. The spacing between the sensing head 600 and the roll 620 and the surface characteristics of the roll may be the same as described in FIGURE 20. The roll 620 in FIGURE 21 has been illustrated as being mounted by means of suitable framework 722 for rotation on its central axis as in FIGURE 19. Suitable means may be coupled to the roll 620 for driving the same as in the previous embodiment. Web guiding means have been diagrammatically indicated at 725 and 726 for positively maintaining a desired web geometry within the influence of the field of the sensing head 600. This same arrangement may apply to the embodiment of FIGURE 19.

As in the previous embodiment, a rigid spacial relationship is maintained between the roll 620 and the sensing device 600 by means of a common rigid structure indicated diagrammatically at 730 in FIGURE 21 which is rigidly secured to the support frame 722 and to guide means or tracks indicated diagrammatically at 732 for carriage 733 rigidly mounting the sensing head 600. Suitable means may be provided for cyclically moving the carriage 733 along the guide tracks 732 as in the embodiment of FIGURE 19 to cyclically scan the entire width of the web 612.

By way of example, the guide means 725 and 726 may comprise cooperating sets of driven rollers driven so as to maintain the web 612 taut therebetween.

Microwave power guided along an open conductor which follows a curved path suffers appreciable loss probably due to radiation from the conductor. To a first approximation, it appears that the loss in decibels per unit length of wire is nearly proportional to the inverse of the radius of curvature. There are indications, however, that as the radius of curvature is reduced to the order of one wavelength, the losses increase still more rapidly.

It has been found that this loss due to curvature can be reduced or even eliminated by adding a dielectric on the inside of the curve, for example as indicated at 662 in FIGURE 20. It seems that the dielectric acts with the microwave energy somewhat analogously to glass with light and refracts the wave so that it follows the conductor indicated in the form of a helical coil at 630c in FIGURE 20. Transmission around a coil has been effected virtually without loss.

For lossless transmission, it is essential that the radius of curvature be correctly proportioned to the dielectric constant of the dielectric. With too large a radius of curvature, the wave is refracted off the conductor into the dielectric (as with a dielectric placed on one side only of a straight conductor). With too small a radius of curvature, the refraction is insufficient and some of the wave is radiated outward.

On the inside of the curve, in the dielectric, the wave energy is almost wholly confined to a narrow region close to the conductor. This confinement is due to the dielectric. The distance traveled by the wave in passing around an arc subtending an angle $e$ of a circle of radius $r$ is therefore $re$. The speed of the wave in the dielectric is $c/\sqrt{e}$ where $e$ is the dielectric constant. Therefore, the time required to traverse the arc $re$ is $$\frac{e}{c}r\sqrt{e}$$

On the outside of the curve, in air, the wave energy will spread over a distance from the conductor which may be several wavelengths for a good conductor, uninsulated and with a smooth surface or about half a wavelength if the conductor has a thin dielectric coat or has a roughened or corrugated surface. For a partially confined wave, the means radius of curvature for the wave in air is approximately $$r + \frac{\lambda}{4}$$

Since $c$ is the speed of the wave energy in air, the time required to traverse the angle $e$ is $$\frac{e}{c}\left(r + \frac{\lambda}{4}\right)$$

It is found that satisfactory transmission around a curve is obtained if the radius of curvature and the dielectric constant are matched so that the traverse time on the inside and outside of the curve are equal, that is $$\frac{e}{c} r \sqrt{e} = \frac{e}{c}\left(r + \frac{\lambda}{4}\right)$$

so that $$r \sqrt{e} = r + \frac{\lambda}{4}$$

While this relationship has been found to give a satisfactory result, it does not necessarily give the optimum condition.

Some further improvement in transmission around a curve may be obtained by using a thick conductor, so that the wave on the outside surface of the conductor has further to travel than on the inside surface. A tapered dielectric coating may be supplied to the conductor to match or synchronize the wave travel at all points around the conductor surface including side surface portions as well as outer surface portions and inner surface portions.

A coil may be close or open wound. For a close wound coil where the microwave energy associated with one turn is closely coupled with the microwave energy of an adjacent turn and for a closed loop the length of the loop or of the multiple loops forming a coil is preferably such that the microwave energy which travels about a loop and returns to a point at or adjacent to the entrance point of the loop will have a predetermined phase relation to microwave energy entering the loop. It is found that the characteristics of a loop for a given microwave frequency are critically related to the length of the loop in relation to the wavelength of the microwave signal. Where the length of the loop is equal to a whole number of wavelengths, the field due to the microwave energy entering the loop will be reinforced by the field of the microwave energy which has traveled about the loop and has returned to or adjacent to the entrance point of the loop. If the length of the loop is an odd multiple of ½ wavelength, the field due to the entering microwave signal will be opposite the field due to the microwave energy which has traveled about the loop so that the loop acts as a reflector of the microwave power.

When the length of the loop is adjusted for reinforcement, if the losses around the loop amount to 10%, then the power circulating in the loop must be 10 times the input power before the losses will balance the input. Loop losses as low as 0.1% should be easily obtainable, giving gains in field strength of 1000 times. Thus if a loop type microwave device adjusted for reinforcement is used to detect moisture in paper, a 1% absorption of microwave energy by moisture in the paper would drop the circulating power in the device by a factor of 10 (i.e. 10 db drop from 1000 times) and a 10% absorption would drop the circulating power to 10 times (or a further 10 db drop).

Since the loop length is a whole number of wavelengths for maximum gain, a loop device in accordance with the present invention can be utilized as a wavemeter. Since the device is highly frequency sensitive, the device can also fulfill the same function as a cavity resonator.

It is found that microwave power can be induced from one coil or closed loop to another coil or closed loop placed in close proximity, and in a similar manner to that commonly practiced at lower frequencies in the audio and radio frequency part of the spectrum but never previously attempted at microwave frequencies. At microwave frequencies there are, of course, the special requirements noted above with respect to the means for preventing radiation loss from the coil and with respect to the proportioning of the length of the loops with respect to the wavelength of the applied microwave energy.

An effective microwave attenuator can be obtained by winding a coil using resistance wire of a few ohms per inch. As a terminating attenuator, the far end of the coil may be simply left open ended. A terminating attenuator for 22,000 megacycles per second was constructed comprising 10 turns of resistance wire wound on a core of "Teflon" which is a tetrafluoroethylene resin material having a dielectric constant of about 2. The core had a diameter of about 1¼ inches and the total resistance of the wire wound on the core was 240 ohms. There was no detectable standing wave on the conductor leading to the attenuator, showing that it was a very effective totally absorbing termination. A similar coil of 7 turns gave 20 db attenuation through the coil.

It is noted that using a material of dielectric constant 6 (for example a suitable ceramic material such as that manufactured under the trade name "Pyroceram"), an effective attenuator for use at 22,000 megacycles per second can be made by winding resistance wire on a dielectric core of about 0.5 centimeter diameter. Such an attenuator closely resembles a common wire wound electronic resistor in both appearance and function, but the similarity is only superficial because the common electronic resistor has no critical relations between its dimensions and wavelength, and its operation is entirely different. For example, the conventional electronic resistor would be inoperative with one end open circuited and would not be provided with surface wave coupling means for connecting the same in a single conductor surface wave transmission line.

For high frequencies and particularly above 100,000 megacycles per second, for which the wavelengths are less than 3 millimeters, a dielectric of small dielectric constant would be desirable. For example, at 200,000 megacycles per second, a "Teflon" core would have to be about 2 millimeters diameter which may be inconveniently small. A suitable material might be obtained by "foaming" a core of "Teflon" so as to produce a material, for example about 30% "Teflon" and 70% air. Such a material could be expected to have a dielectric constant of about 1.3, which at 200,000 megacycles per second would call for a core diameter of about 0.5 centimeter.

A variable attenuator can be obtained by providing a tapered axially shiftable dielectric core in conjunction with a closed loop or coil. Also, a porous dielectric core could be used and a variable attenuator obtained by inserting more or less of an absorbing gas or liquid in the porous core. Attenuation can be frequency selective by molecular resonance of the absorbing gas or liquid.

With respect to the embodiments of FIGURES 20 and 21, it has been found that at certain critical frequencies in the microwave region, for example approximately 22,000 megacycles per second, the microwave energy transmitted along a wave guide may be relatively unaffected by the presence of a paper web while being critically sensitive to the moisture content of the web. The microwave source such as indicated at 670 in FIGURE 20 may deliver microwave energy to wave guide 630 at such resonance absorption frequency for water if it is desired to determine the moisture content of the paper web 612.

The coil 630c is preferably proportioned as described above so as to provide reinforcement of the wave energy at successive turns of the coil at the excitation frequency.

The dielectric mass indicated at 662 is so proportioned in relation to the dielectric such as air on the outer side of the coil to cause the microwave energy to travel about the coil without substantial loss as described above.

In FIGURE 20, points 815 and 816 on coil 630c may be separated by less than a half wavelength, for example ¼ inch for a wavelength of 1.35 centimeters. The electrical length of each loop path is preferably an even number of half wavelengths to provide reinforcement at corresponding points on the respective loop paths, such as points 815 and 816.

It will be observed that a portion of the periphery of the coil 630c is in proximity to the web 30. With relatively thin webs in comparison to the wavelength of the microwave energy transmitted along the coil, no special provision may be necessary to prevent undue radiation microwave energy at the portion of the coil coupled to the paper web. In fact, the tendency of the microwave energy to be retarded at the region of impingement on the dielectric medium may amplify the effect of the pressure of moisture in the paper web and provide a greater apparent power loss.

If it is desired to compensate for the retarding effect on the wave energy of the presence of the web, the region of the coil coupled to the web may be provided with a larger radius of curvature than other portions of the coil so that the retarding effect of a dry paper web, for example, at the region would provide a wave velocity related to the wave velocity at the inner side of the coil in dielectric medium 662 such as to prevent undue radiation from the coil at the region.

Other methods of balancing wave velocity on respective sides of a conductor to prevent radiation from the conductor are disclosed in my copending application Serial No. 710,766 filed January 23, 1958 and entitled "Apparatus and Method for Measurement of Moisture Content."

As a modification of FIGURE 19, a sensing device as shown in FIGURE 7 may be mounted on traversing carriage 610 in place of the sensing head 600 of FIGURE 20. In this case, parts 120a, 120b, 161, 162, 165, 166, 169, 131, 132, 131a, 132a, 135 and 136 would be omitted, and parts 120, 122, 123, 137, 138, 141, 142, 171, 172, 175, 176, 180, 181, 182, 183, 185, 186, 190 and 191 would be mounted in a rigid box structure as indicated by dash line 820 in FIGURE 7 which would maintain line 120 under tension between end walls 171 and 172 and maintain a predetermined spacing between coupling devices 122 and 123. Thus the components within dash line 820 in FIGURE 7 would be mounted on traversing carriage 610 shown in FIGURE 20 with line 120 maintained at a fixed spacing from the surface of roll 620 as with sensing head 600. The surface of roll 620 may have the same characteristics described for the roll in connection with FIGURE 19. The web may have the same configuration and drive arrangement as described in connection with FIGURES 19 and 21.

The line 120 may extend parallel to the axis of roll and have an axial extent of 6 inches, for example, while web 612 may have a width dimension of 20 to 30 feet.

In FIGURE 7, windows 175 and 176 of coupling devices 122 and 123 may be considered as comprising relatively thick lens type structures for providing a rigid positioning of the couplers relative to the line 120. As an alternative arrangement, windows 175 and 176 may be of the more usual thin construction, and a suitable box-like rigid structure as indicated at 820 may be rigidly secured to the launching devices 122 and 123 to rigidly determine their relative spacing and orientation. In this modification, the entire box structure 820 might be effectively supported by the rotating wheels 131 and 132 which may have a surface velocity corresponding to the velocity of the web 110.

With a rigid box structure 820 as just described, a sliding contact could be provided between the end walls 171 and 172 and the wire 120 including integral parts 120a and 120b. A similar sliding relationship could be provided between center conductor part 821 of coupling device 122 and the wire 120. The coupling device 123 could be provided with a center conductor part in sliding contact with wire 120 as shown for coupling part 122, in which case all of the components associated with the rigid box structure 820 could be moved laterally of the web 110 by sliding on the wire 120 while the box structure was supported by the wheels 131 and 132. In this case, the windows 175 and 176 would also slidingly receive the wire 120 to accommodate relative sliding movement thereof on the wire.

As another alternative, the wire 120 could be secured to end walls 171 and 172, and the wire 120 could extend for a substantial distance through small conforming apertures in brackets 161 and 162. In this case, the box structure 820 could be moved transversely of the web 110 by pulling on one of the wires such as 120b while releasing the other wire such as 120a. Pulling on the wire 120b would move the entire box structure 820 to the right as seen in FIGURE 7, the wheels 131 and 132 sliding in the axial direction relative to the web 110 while continuing to rotate in accordance with the velocity of the web 110 in the longitudinal direction.

It will be understood that it is not essential that wheels 131 and 132 be rotatable relative to flaring sections 137 and 138, for example, since a rotating coupling could be placed in the constant diameter sections 141 and 142 of the coupling devices to accommodate rotation of the flaring sections 137 and 138 with wheels 131 and 132. In this case, wheel portions 131 and 132 would be fixedly secured to the horn sections 137 and 138 and ball bearings 135 and 136 could be omitted. By a suitable arrangement, the portion of the wire 120 within the flaring sections 137 and 138 could also rotate with the wheels 131 and 132. Thus a rotating joint could be provided within the center conductor part 821 and a corresponding center conductor part for the launching device 123.

Referring to FIGURE 4 the sides of bar 53b may have thick coatings 820 and 821 of dielectric material to restrict the effective field to a region within the dielectric material at the sides of the bar. It will be understood that regions of substantial field indicated at 70c and 70d in FIGURE 4 are merely diagrammatically shown and that an actual mapping of a line of constant energy about bar 53b would be somewhat curved and would intersect coatings 820 and 821.

In FIGURE 7 other suitable means may be provided for coupling microwave energy from rectangular waveguide to surface wave line 120, and from line 120 to detector 191.

In FIGURE 9 instead of using dielectric material continuously within guides 235 and 240, dielectric spacers may be used at intervals along the line as will be understood by those skilled in the art.

With respect to FIGURES 17 and 18, the coupling devices 513, 513a or 557, 557a may have a diameter of ½ inch, for example. A paper web such as indicated at 518 may have a thickness of 1/20 inch, for example. It will thus be understood that the thickness of the web is exaggerated in these figures. The web 518 may be entirely below the level of couplers 513, 513a or 557, 557a and be wider than the spacing between the couplers.

As an alternative to detecting the constituent by means of its absorption effect with respect to microwave energy, it would be feasible in all of the embodiments described herein to use a system depending on change of phase of the microwave energy.

The principle can be illustrated by reference to FIGURE 17 in which the microwave energy is divided at element 543 so that part travels by the sensing path through elements 555, 557, 540 and 557a to detector 560, and part travels through elements 544 and 545 to detector 547.

If the relative phase of the signals received at detectors 547 and 560 is detected or measured, the change in phase resulting from the presence of the web 518 will serve as a measure of the constituent in the web in accordance with a previous calibration.

The phase detectors used at positions 547 and 560 might be mixers powered from the same local oscillator. The two heterodyne signals could then be amplified and fed to the X and Y plates, respectively, of an oscilloscope or other suitable phase comparator.

A variable microwave phase shifter could be used in place of the attenuator 545 and adjusted to maintain the two signals at detectors 547 and 560 in constant phase relationship, as indicated by the oscilloscope or other device. The position of the phase shifter would then provide a measure of the constituent in the web 518.

It will be apparent that the different electrical systems for sensing the desired result in any of the embodiments or modifications described may be applied to any of the other embodiments. Frequency modulation may be utilized in any of the embodiments, and in addition to the mechanical modulating system previously described, frequency may be modulated by suitable control of the electrical supplies which furnish power to the oscillator. While, for convenience, certain orientations have been referred to in describing various figures, these orientations should not be construed as limiting; for example in FIGURES 19 and 21, the web could travel over the top surface of a roller, and the sensing head be suspended from a suitable rigid member such as an I-beam rigidly carried by the same supporting structure which mounts the roll. In each of the embodiments, the cross section of the transmission line may be any of the cross sections herein disclosed, and of course other cross section configurations may be utilized as will be apparent from the teachings herein. While two conductors 72 and 73 have been illustrated for example in FIGURES 1 through 5 as a conductive path for the detected microwave energy from detector 64 or 64a, the interior surface of the sensing device itself could be utilized as one of these conductors if desired.

I claim as my invention:

1. Apparatus for sensing a constituent of material comprising a sensing device having means defining a surface wave transmission path, means for coupling a microwave signal to said surface wave transmission path to transmit said microwave signal along said transmission path as a surface wave, said sensing device having means at each of at least two opposite sides of said surface wave transmission path for removably receiving a solid material which includes a constituent to be detected within the field of said surface wave, the frequency of said surface wave being such as to give a reliable indication of the presence of said constituent within its field, and means for detecting said microwave signal transmitted along said path as an indication of the presence of said constituent.

2. Apparatus for sensing a constituent of solid material comprising a sensing device having means defining a surface wave transmission path, means for coupling a microwave signal to said surface wave transmission path to transmit said microwave signal along said transmission path as a surface wave, said sensing device having means at each of at least two opposite sides of said surface wave transmission path for removably receiving a solid material which includes a constituent to be detected within the field of said surface wave, the frequency of said surface wave being such as to give a reliable indication of the presence of said constituent within its field, and means for detecting said microwave signal transmitted along said path as an indication of the presence of said constituent, said device comprising a substantially rigid self-sustaining unit.

3. Apparatus for sensing a constituent of material comprising a sensing device comprising a single conductor surface wave transmission line, means for coupling a microwave signal to said single conductor surface wave transmission line to transmit said microwave signal along said transmission line as a surface wave, said sensing device having a free end portion which gradually diminishes from a relatively large overall cross section to a relatively smaller overall cross section tip for facilitating insertion of said device into a volume of a material which includes a constituent to be detected to expose said material to the field of said surface wave, the frequency of said surface wave being such as to give a reliable indication of the presence of said constituent within its field, and means for detecting said microwave signal as an indication of the presence of said constituent.

4. Apparatus for sensing a constituent of material comprising a sensing device having means defining a surface wave transmission path, means for coupling a microwave signal to said surface wave transmission path to transmit said microwave signal along said transmission path as a surface wave, said sensing device having means at each of at least two opposite sides of said surface wave transmission path for removably receiving a solid material which includes a constituent to be detected within the field of said surface wave, the frequency of said surface wave being such as to give a reliable indication of the presence of said constituent within its field, and means for detecting said microwave signal transmitted along said path as an indication of the presence of said constituent, said surface wave transmission path defining means, said coupling means and said detecting means being substantially rigidly secured together for handling as a unit.

5. Apparatus for sensing a constituent of material comprising a sensing device having means defining a surface wave transmission path, means for coupling a microwave signal to said surface wave transmission path to transmit said microwave signal along said transmission path as a surface wave, said sensing device having means for removably receiving a solid material which includes a constituent to be detected within the field of said surface wave, the frequency of said surface wave being such as to give a reliable indication of the presence of said constituent within its field, and means for detecting said microwave signal transmitted along said path as an indication of the presence of said constituent, said device having a region of external dimensions to be conveniently grasped by the hand in manipulating said device which region is located outside of the influence of said surface wave.

6. Apparatus for sensing a constituent of material comprising a sensing device having means defining a surface wave transmission path, means for coupling a microwave signal to said surface wave transmission path to transmit said microwave signal along said transmission path as a surface wave, said sensing device having means at each of at least two opposite sides of said surface transmission path for removably receiving a solid material which includes a constituent to be detected within the field of said surface wave, the frequency of said surface wave being such as to give a reliable indication of the presence of said constituent within its field, and means for detecting said microwave signal transmitted along said path as an indication of the presence of said constituent, said surface wave transmission path defining means comprising an exterior metallic surface engaging said material.

7. Apparatus for sensing a constituent of material comprising a sensing device having means defining a surface wave transmission path, means for coupling a microwave signal to said surface wave transmission path to transmit said microwave signal along said transmission path as a surface wave, said sensing device having means for removably receiving a solid material which includes a constituent to be detected within the field of said surface wave, the frequency of said surface wave being such as to give a reliable indication of the presence of said constituent within its field, and means for detecting said microwave signal transmitted along said path as an indication of the presence of said constituent, said surface wave transmission path defining means being of cross section to provide a substantially rigid device where said material is exposed to said surface wave.

8. Apparatus for sensing a constituent of material comprising a sensing device having means defining a surface wave transmission path, means for coupling a microwave signal to said surface wave transmission path to transmit said microwave signal along said transmission path as a surface wave, said sensing device having means for removably receiving a material which includes a constituent to be detected within the field of said surface wave, the frequency of said surface wave being such as to give a reliable indication of the presence of said constituent within its field, and means for detecting said microwave signal transmitted along said path as an indication of the presence of said constituent, said device having a region containing a predominate proportion of the energy of said surface wave completely surrounding said path, and said material substantially completely filling said region in coupling relation to the surface wave transmitted along said path.

9. The method of sensing a constituent of solid material comprising relatively moving a surface wave transmission path and the material into coupling relation, transmitting microwave energy of a frequency differentially sensitive to said constituent along said transmission path as a surface wave, and detecting said microwave energy transmitted along said path as an indication of the presence of said constituent.

10. The method of sensing a constituent of sheet material comprising inserting a surface wave transmission line into a stack of said sheet material between and in contact with adjacent sheets thereof, transmitting microwave energy of a frequency differentially sensitive to said constituent along said surface wave transmission line as a surface wave, and detecting said microwave energy transmitted along said transmission line as an indication of the presence of said constituent of said sheet material.

11. The method of sensing a constituent of granular material which comprises relatively bringing a volume of said granular material into an annular space surrounding a single conductor surface wave transmission path, transmitting microwave energy of frequency differentially sensitive to said constituent along said transmission path as a surface wave, and detecting said microwave energy transmitted along said path as an indication of the presence of said constituent.

12. Apparatus for sensing a constituent of web material comprising a rigid structure, web support means mounted on said rigid structure in precisely determined relation thereto for positively contacting and supporting a web moving thereacross, microwave energy transmitting means mounted on said rigid structure in precisely determined relation to said web support means for transmitting microwave energy along said web support means in coupling relation to the portion of the web contacting said web support means, means coupled to said microwave energy transmitting means for supplying microwave energy to said transmitting means of a frequency to give a reliable indication of the presence of said constituent, and means coupled to said transmitting means for sensing said microwave energy transmitted thereby to provide an indication of the presence of said constituent in said moving web, said web support means providing support for said web over substantially the entire area of the web which is subjected to the microwave energy of said microwave energy transmitting means, and said microwave energy transmitting means being located on the opposite side of said web from said web support means 13. Apparatus for sensing a constituent of web material comprising a rigid structure, web support means mounted on said rigid structure in precisely determined relation thereto for positively contacting and supporting a web moving thereacross, microwave energy transmitting means mounted on said rigid structure in precisely determined relation to said web support means for transmitting microwave energy along said web support means in coupling relation to the portion of the web contacting said web support means, means coupled to said microwave energy transmitting means for supplying microwave energy to said transmitting means of a frequency to give a reliable indication of the presence of said constituent, means coupled to said transmitting means for sensing said microwave energy transmitted thereby to provide an indication of the presence of said constituent in said moving web, said web supporting means having an extent transversely of the direction of movement of the web substantially greater than the transverse extent of said microwave energy transmitting means, and means mounting said transmitting means for movement transversely of the direction of web movement while maintaining a precisely determined spacial relationship between said transmitting means and said web support means.

References Cited in the file of this patent

UNITED STATES PATENTS

| | | |
|---|---|---|
| 2,457,695 | Liskow | Dec. 28, 1948 |
| 2,611,804 | Zaleski | Sept. 23, 1952 |
| 2,659,860 | Breazeale | Nov. 17, 1953 |
| 2,782,382 | Clavier et al. | Feb. 19, 1957 |
| 2,798,197 | Thurston | July 2, 1957 |
| 2,867,781 | Tomiyasu | Jan. 6, 1959 |

FOREIGN PATENTS

| | | |
|---|---|---|
| 1,102,199 | France | May 4, 1955 |

OTHER REFERENCES

"Experiments With Single Wire Transmission Lines at 3 CM. Wavelength," article in Journal of the British Institution of Radio Engineers; April 1953; pages 194–199.